(12) United States Patent
Ueda et al.

(10) Patent No.: US 8,401,141 B2
(45) Date of Patent: Mar. 19, 2013

(54) AXIAL VOID FRACTION DISTRIBUTION MEASUREMENT METHOD AND NEUTRON MULTIPLICATION FACTOR EVALUATING METHOD

(75) Inventors: Makoto Ueda, Kanagawa (JP); Hironori Kumanomido, Kanagawa (JP); Ishi Mitsuhashi, Kanagawa (JP); Tsukasa Kikuchi, Tokyo (JP); Kenichi Yoshioka, Kanagawa (JP); Tomoharu Sasaki, Kanagawa (JP); Kouji Hiraiwa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 709 days.

(21) Appl. No.: 12/345,438

(22) Filed: Dec. 29, 2008

(65) Prior Publication Data
US 2009/0252271 A1    Oct. 8, 2009

Related U.S. Application Data

(63) Continuation of application No. 11/434,195, filed on May 16, 2006, now abandoned.

(30) Foreign Application Priority Data

May 17, 2005  (JP) .................................. 2005-143884

(51) Int. Cl.
 *G21C 17/00*    (2006.01)
(52) U.S. Cl. ...... 376/245; 376/254; 376/255; 250/336.1
(58) Field of Classification Search .................. 376/245, 376/254, 255; 250/336.1
See application file for complete search history.

(56) References Cited

U.S. PATENT DOCUMENTS 5,315,117 A    5/1994  Hatton et al.

FOREIGN PATENT DOCUMENTS

| JP | 10-115693 | 5/1998 |
| JP | 11-101890 | 4/1999 |

OTHER PUBLICATIONS

Tsutomu Yokoyama, et al. "Neutron Emission Characteristics of Spent Boiling Water Reactor Fuel," Nuclear Technology, vol. 57, Jun. 1982, pp. 372-388.

*Primary Examiner* — Ricardo Palabrica
(74) *Attorney, Agent, or Firm* — Oblon, Spivak, McClelland, Maier & Neustadt, L.L.P.

(57) ABSTRACT

A first intensity $A_z$ expressed as $A_z=a_z \times E^\alpha$, a first reference intensity $A_0$ expressed as $A_0=a_0 \times E^\alpha$, a second intensity $B_z$ expressed as $B_z=b_z \times E$, and a second reference intensity $B_0=b_0 \times E$, are evaluated. The first intensity and the first reference intensity are of radioactive nuclides generated by a neutron capture reaction of a heavy nuclide or a fission product nuclide. The second intensity and the second reference intensity are of radioactive fission product nuclides except nuclides generated by a neutron capture reaction. The reference intensities are measured where the void fraction is known. Also a correlation curve of $(a_z/a_0)$ and a void fraction is evaluated. Finally an axial void fraction distribution is evaluated based on the value of $(a_z/a_0)$ and the correlation curve.

11 Claims, 25 Drawing Sheets

AXIAL VOID FRACTION DISTRIBUTION MEASUREMENT METHOD AND NEUTRON MULTIPLICATION FACTOR EVALUATING METHOD

CROSS REFERENCE TO RELATED APPLICATION

This application is a continuation of and claims the benefit of priority under 35 U.S.C. §120 from U.S. Ser. No. 11/434,195 filed May 16, 2006, and claims the benefit of priority under 35 U.S.C. §119 from Japanese Patent Application No. 2005-143884 filed May 15, 2005, the entire contents of each of which are incorporated herein by reference.

BACKGROUND OF THE INVENTION

The present invention relates to a measurement method of an axial void fraction distribution in a core of a boiling water reactor (BWR), and also to an evaluating method of a neutron multiplication factor of a fuel assembly to be contained in a container apparatus.

In a BWR, cooling water is heated and boiled in a reactor core as it flows from the bottom of the core to the top of the core. So, a void fraction that is a ratio of the bubbles to space where the cooling water flows in a channel box, increases as the cooling water flows from the upstream (the bottom of the core) to the downstream (the top of the core).

The void fraction significantly affects core characteristics such as reactivity, power distribution and cooling characteristics. Therefore, it is important to quantitatively evaluate the void fraction distribution.

However, no report has been made on an actual measurement of the void fraction distribution in the core of a commercial BWR because of lack of feasible measurement technique. Conventionally, a mock experiment is conducted out of the commercial reactor to build a theoretical model, and based upon the model, the void fraction distribution of the actual BWR is computationally evaluated.

It has been recognized that the measurement of the void fraction distribution is necessary for a long time. It was reported that a change of nuclear characteristics due to a change of void fraction was indirectly measured by simulating voids in a critical facility that rarely emit thermal power.

In this measurement, a wire containing manganese (Mn), called Manganin (Trade Mark) wire was installed in an experimental reactor core, and a thermal neutron absorber, cadmium (Cd), was wound around the Manganin wire. A cadmium ratio (Cd-ratio) in Mn55 (n, γ) reactions was measured.

In this measurement, a wire containing manganese (Mn) (Manganin wire) was partly wrapped with cadmium (Cd), which is a thermal neutron absorber, and introduced into the reactor core of the experiment system. Then, the cadmium ratio in the reaction ratio of the reaction of Mn55 (n, γ) was measured.

Various diameters of aluminum tubes were introduced in a test core and Cd-ratios were measured. These measurements show that Cd-ratio has a good correlation with a void fraction. So the report says that a void fraction can be measured by measuring Cd-ratio. The basic principle of the proposed technique is excellent, because it is based on the fact that a void fraction has a good correlation with the ratio of the non-thermal neutron flux and the thermal neutron flux.

One of the inventors of the present invention proposed more practical techniques that use the basic principle described above but does not require the use of Cd in Japanese Patent Application Disclosure No. Sho 55-121195 and Japanese Patent Application Disclosure No. Sho 55-125489. According to these documents, a strong thermal neutron absorber such as $Gd_2O_3$ that has a high melting point or a weak neutron absorber such as stainless steel is locally arranged in fuel assemblies, in-core instrumentation tube, a fixed position neutron detector or a movable neutron detector to cause a local distortion in a thermal neutron flux. Then, a thermal neutron flux and a non-thermal neutron flux are separated, and a void fraction is determined from a ratio of the two neutron fluxes.

The above-described technique is hard to apply to an operating nuclear reactor, because it employs Cd having a low melting point that might harm structure materials of the operating reactor.

The inventors of the present invention have been studying new techniques of utilizing an in-core instrumentation tube. One of the techniques is a void fraction measurement method using a ratio of a non-thermal flux and a thermal flux, as well as a ratio of a thermal neutron flux and a fast neutron flux that has a larger dependency on a void fraction than non-thermal neutron flux.

To use this technique, it is necessary to discharge the in-core instrumentation tube from the reactor and measure the tube during an outage of reactor operation. At the time of measurement, a dedicated holder has to be prepared in order to accurately place the instrumentation tube and the detector because the shape of the tube has to be maintained finely and accurately for measurement. In addition, since the instrumentation tube is arranged in the water gap between the fuel assemblies, a measured void fraction is an average of at least four surrounding fuel assemblies, and the instrumentation tube and the detection sensitivity is significantly lower than inside of a fuel assembly.

As described above, while the axial void fraction distribution is very important for a BWR, no technique has been available for actual measurement of an axial void fraction distribution in an operating commercial nuclear reactor.

When discharging an irradiated BWR fuel assembly from the core and containing it in a fuel assembly containing apparatus such as a transport vessel (cask) or a fuel storage rack in water, a neutron multiplication factor (or reactivity) at the axial position of ⅔ to ¾ from the lower end of the axial fuel active part tends to be higher. Such a trend appears due to design requirements such as that the flat axial thermal power distribution is preferable during the operation and due to a delay of burning of uranium and generated plutonium in an upper part (downstream of the coolant flow) because of an effect of the axial void fraction distribution and of a high generation rate of plutonium as a result of a high conversion ratio.

Under these circumstances, for a purpose of an assured sub-criticality analysis, i.e. making sure of criticality safety, it is necessary to take an axial void fraction distribution into account to evaluate a multiplication factor. One way to achieve this purpose is to include a large design margin.

In view of the above-identified problems, it is therefore the first object of the present invention to provide a novel and highly feasible method to evaluate an axial void distribution. The second object of the present invention is to provide a method to experimentally evaluate the neutron multiplication factor of a fuel assembly so that a large design margin may not be required to avoid a critical accident while containing an irradiated (discharged) BWR fuel assembly in a fuel assembly containing apparatus.

BRIEF SUMMARY OF THE INVENTION

The present invention has been made to solve the above problems, and has an object of providing axial void fraction distribution measurement method and neutron multiplication factor evaluating method.

According to an aspect of the present invention, there is provided a method for evaluating an axial void fraction distribution of a fuel irradiated in a nuclear reactor, the method comprising: measuring a first intensity $A_z$ of a type of radiation (radioactive ray) emitted from a nuclide of a first group at an axial position of the fuel, the first group consisting of radioactive nuclides generated by a neutron capture reaction of a heavy nuclide or a fission product nuclide; measuring a second intensity $B_z$ of a type of radioactive ray emitted from a nuclide of a second group at an axial position of the fuel, the second group consisting of radioactive fission product nuclides except nuclides generated by a neutron capture reaction; measuring a first reference intensity $A_0$ of the same type of radioactive rays of the first intensity at an axial reference position of the fuel at which a void fraction of the fuel can be evaluated; measuring a second reference intensity $B_0$ of the same type of radioactive rays of the second intensity at the axial reference position; calculating a exponent constant $\alpha$ used in an expression of $A_z = a_z \times E^\alpha$ and $A_0 = a_0 \times E^\alpha$ where E is an exposure of the fuel, $a_z$ and $a_0$ are proportionality constants; evaluating a value of $(a_z/a_0)$ by an equation of $(a_z/a_0) = (A_z/A_0)(B_0/B_z)^\alpha (b_z/b_0)$, where $b_z$ is a value used in an expression of $B_z = b_z \times E$ as a proportionality constant, $b_0$ is a value used in an expression of $B_0 = b_0 \times E$ as a proportionality constant; evaluating a correlation curve of $(a_z/a_0)$ and a void fraction; and evaluating the axial void fraction distribution based on the value of $(a_z/a_0)$ and the correlation curve.

According to another aspect of the present invention, there is provided a method for evaluating an axial void fraction distribution of a fuel irradiated in a nuclear reactor, the method comprising: measuring a first intensity $A_z$ of gamma ray emitted from cesium 134 or europium 154 at an axial position of the fuel; measuring a first reference intensity $A_0$ of a same type of radioactive rays of the first intensity at an axial reference position of the fuel at which a void fraction of the fuel can be evaluated; measuring a second intensity $B_z$ of gamma ray emitted from cesium 137 or cerium 144 at an axial position of the fuel; measuring a second reference intensity $B_0$ of a same type of radioactive rays of the first intensity at the axial reference position; calculating $G_z/G_0 = (A_z/B_z)/(A_0/B_0)$; evaluating a correlation curve of $(G_z/G_0)$ and a void fraction; and evaluating the axial void fraction distribution based on the value of $(G_z/G_0)$ and the correlation curve.

According to yet another aspect of the present invention, there is provided a method for evaluating an axial void fraction distribution of a fuel irradiated in a nuclear reactor, the method comprising: measuring a radiation ray intensity of radioactive rays emitted from nuclides at an axial position of the fuel for at least twice with a definite interval, the nuclides generated by a neutron capture reaction of a heavy nuclide or a fission product nuclide; measuring a radiation ray reference intensity of a same type of radioactive rays of the radioactive ray intensity at a reference position for at least twice with a definite interval, the axial reference position of the fuel at which a void fraction of the fuel can be evaluated; dividing the radiation ray intensity into that of a first neutron emission rate $A_z$ from curium 242 and that of a second neutron emission rate $B_z$ from nuclides except curium 242; dividing the radiation ray reference intensity into that of a first reference neutron emission rate $A_0$ from curium 242 and that of a second reference neutron emission rate $B_0$ from nuclides except curium 242; calculating a of an exponent constant expressed in equations of $A_z = a_z \times E^\alpha$, $A_0 = a_0 \times E^\alpha$ by using the exposure E, and proportionality constants $a_z$ and $a_0$; calculating p of an exponent constant expressed in equations of $B_z = b_z \times E^\beta$, $B_0 = b_0 \times E^\beta$ by using the exposure E, and proportionality constants $b_z$ and $b_0$; calculating $(a_z/a_0)^\alpha (b_0/b_z)^\beta$ by an equation of $(a_z/a_0)^\alpha (b_0/b_z)^\beta = (A_z/A_0)^\alpha (B_0/B_z)^\beta$; evaluating a correlation curve of $(a_z/a_0)^\alpha (b_0/b_z)^\beta$ and a void fraction; and evaluating the axial void fraction distribution based on the value of $(a_z/a_0)^\alpha (b_0/b_z)^\beta$ and the correlation curve.

According to yet another aspect of the present invention, there is provided a method for evaluating a neutron multiplication factor of a fuel assembly irradiated in a nuclear reactor, the method comprising: measuring a neutron counting rate $\phi_0$ at a reference position of the fuel assembly where a void fraction is known, and evaluating a neutron multiplication factor $k_0$; measuring a neutron counting rate $\phi_z$ at a multiplication factor evaluation point of the fuel assembly; calculating $\phi_0/\phi_z$; measuring a gross gamma intensity ratio $(\gamma_g/\gamma_{g0})$ at the multiplication factor evaluation point and the reference position; evaluating a relationship between the gross gamma intensity ratio and an exposure of the fuel assembly; evaluating an exposure ratio $(E_z/E_0)$ at the multiplication factor evaluation point and the reference position based on the relationship between the gross gamma intensity ratio and an exposure of the fuel assembly; calculating $(E_z/E_0)^\alpha$ based on a value of $\alpha$ calculated otherwise; evaluating a relationship between $(a_z/a_0)$ and a void fraction; evaluating an axial void fraction distribution; evaluating the value of $(a_z/a_0)$ based on the axial void fraction distribution and the relationship between $(a_z/a_0)$ and a void fraction; and calculating the neutron multiplication factor k as $k = 1 - (1-k_0)(\phi_0/\phi_z)(E_z/E_0)^\alpha (a_z/a_0)$.

BRIEF DESCRIPTION OF THE DRAWINGS

The above and other features and advantage of the present invention will become apparent from the discussion herein below of specific, illustrative embodiments thereof presented in conjunction with accompanying drawings, in which.

DETAILED DESCRIPTION OF THE INVENTION

Hereinafter, embodiments of the present invention will be described with reference to the drawings.

The present invention provides a highly practical method of evaluating an axial void fraction distribution of a fuel assembly irradiated in a nuclear reactor (discharged fuels and reload fuels). Attention is paid to the neutron emission rate from the neutron emitting nuclides (radioactivity) generated from uranium and plutonium by capturing neutrons, gamma ray intensity of fission products (radioactivity), and gamma ray intensity of transmuted fission products by capturing neutrons (radioactivity) among various radiations from an irradiated BWR fuel assembly. The present invention also provides a method of evaluating an axial distribution of a neutron multiplication factor of the fuel assembly based on an axial void fraction distribution.

At first, to help understanding the above methods, phenomenon relating to the embodiments are described in detail below.

<<Characteristics of Neutron Emission Rate of Target Nuclides>>

As a spontaneously emitted neutron, a neutron is emitted by photonuclear reactions of high energy gamma rays emitted from fission product La-140 with hydrogen atoms shortly, for example 2 months, after a discharge of a fuel assembly from a reactor. The embodiments are for the fuel after such a cooling period.

It is convenient to categorize nuclides into Cm-242 having a short half-life of 162.8 days, Cm-244 having a relatively long half-life of 18.1 years and other nuclides (residuals). The embodiments use this way to categorize.

The neutron emission rate of Cm-242, that of Cm244 and that of other nuclides are expressed respectively as $S_2$, $S_4$ and $S_R$ hereinafter. While isotope generation and depletion analysis code "ORIGEN" takes U-234, U-238, Pu-238, Pu-239, Pu-240, Pu-241, Pu-242, Am-241, Am-243, Cm-243, Cm-246 and Cf-252 into account as nuclides that belong to $S_R$, there is no problem to deal only with Pu-238 through Am-241 in the above list in practice.

Figure 9:
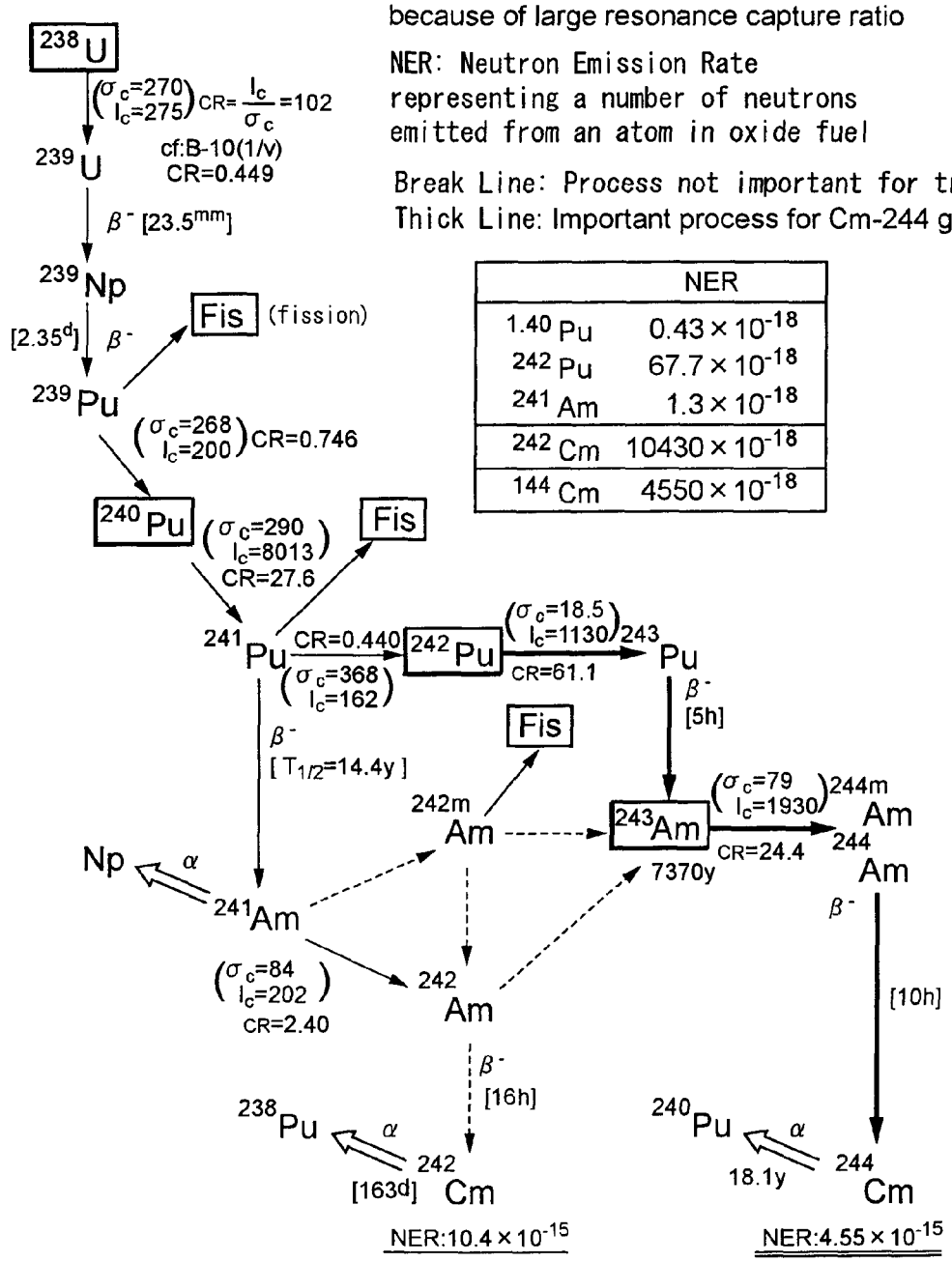
FIG. 9 is a generation process of such neutron emitting nuclides in a uranium fuel.

For example, a generation process of such neutron emitting nuclides in a uranium fuel is described below by referring to FIG. 9. In FIG. 9, σc represents neutron capture cross section (nuclear fission cross section is excluded) for thermal neutrons of which energy is 2200 m/s as its velocity. Ic represents a neutron capture cross section of a resonance region. Ic is also referred to as infinitely-diluted resonance integral of capture. When a void fraction of a moderator is large, neutrons are less moderated and a ratio of thermal neutrons decreases. Then a neutron capture ratio of a resonance region is higher than a neutron capture ratio in a thermal region.

Hereinafter, Capture Ratio CR is defined as Ic/σc. A larger Capture Ratio may result in a higher sensitivity of the reaction on a void fraction. CR of B-10 (CR=0.449) is also cited in FIG. 9 for a reference. There is no resonance phenomenon in resonance region for B-10.

A large amount of U-238 is contained in a fuel, and CR of U-238 contained in a fuel is very large. So, a neutron capture reaction of U-238 generating U-239 is largely affected by a void fraction. Although a self-shielding effect decreases an effective CR, CR remains large.

U-239 decays to Np-239 with a half-life of 23.5 minutes, and Np-239 decays to Pu-239 with a half-life of 2.35 days. CR of Pu-239 is much smaller than that of U-239 or other nuclides. For example, CR of Pu-239 is smaller than twice of CR of B-10. So, a dependency of a neutron capture ratio of Pu-239 to a void fraction is small. Pu-239 fissions and also becomes Pu-240 by a neutron capture reaction.

A void fraction dependency of Pu-240 is relatively large because it has a relatively large CR. Pu-240 spontaneously fissions and emits neutrons (spontaneous fission neutrons). Its neutron emission rate (NER) is relatively large. On the other hand, Pu-240 becomes Pu-241 by a neutron capture reaction.

Pu-241 undergoes fission and also becomes Pu-242 by a neutron capture reaction. However, a void fraction dependency is small because of a small CR. Also, Pu-241 decays to Am-241 with a half-life of 14.4 years.

Am-241 decays, and releases alpha particle. This alpha particle cause (α, n) reaction with oxygen in the fuel and emit neutrons ((α, n) neutrons). Am-241 becomes Am-242 by a neutron capture reaction. This reaction is dependent on a void fraction to a relatively small extent.

Am-242 decays to Cm-242 with a half-life of 16 hours. A spontaneous fission neutron emission rate and an (α, n) neutron emission rate ($S_2$) of Cm-242 is very large. Cm-242 decays to Pu-238 by alpha decay. An (α, n) neutron emission rate of Pu-238 is relatively large.

Pu-241 becomes Pu-242 by a neutron capture reaction that is less dependent on a void fraction. Pu-242 becomes Pu-243 by a neutron capture reaction that is much dependent on a void fraction and it becomes Am-243 with a half-life of 5 hours.

Am-243 becomes Am-244 by a neutron capture reaction that is much dependent on the void fraction. Am-244 decays to Cm-244 with a half-life of 10 hours. Cm-244 decays to Pu-240 again by a decay with a half-life of 18.1 years. But a neutron emission rate of Cm-244 ($S_4$) is very large mainly due to spontaneous fissions.

As described above, neutron capture reactions of any nuclides listed in the thick solid line boxes in FIG. 9 (U-238, Pu-240, Pu-242 and Am-243) depend on the void fraction. And neutron emission rates of nuclides generated by the reaction are influenced by the void fraction experienced during an irradiation of the fuel.

So, a neutron emission rate of Cm-242 ($S_2$) is defined mainly by a void fraction dependency of neutron capture reactions of U-238 and Pu-240. Also, a neutron emission rate of Cm-244 ($S_4$) is defined mainly by a void fraction dependency of neutron capture reactions of Pu-242 and Am-243. A neutron emission rate of any nuclides belonging to $S_R$ is defined mainly by a void fraction dependency of neutron capture reactions of U-238 and Pu-240.

<<Characteristics of Gamma Ray Measurement Target Nuclides>>

Cesium 137 (Cs-137) is directly generated during a nuclear fission without any neutron capture reaction and it decays with a half-life of 30.2 years. A gamma ray of 662 keV emitted from Cs-137 as it decays is measured. A Cs-137 generation rate is roughly proportional to an exposure of the fuel. The measurement might be less accurate if the cooling time is less than a half year or the exposure of the fuel is small, because of a very high background of gamma rays emitted from Cs-134, Zr-95, Nb-95 and other nuclides. In such a case, it is preferable to utilize cerium 144 (Ce-144) or other nuclides in place of Cs-137. A generation rate of Cs-137 is barely dependent on a void fraction. In general, differences between Cs-137 yields of different fissile nuclides are small.

Cs-133 is a stable nuclide generated in a fission, and it becomes Cs-134 by a neutron capture reaction. Cs-134 decays with a half-life of 2.06 years. The Cs-134 generation rate is roughly proportional to a square of the exposure. Since Cs-133 cause a large resonance capture like U-238, a generation rate of Cs-134 depends on a void fraction. Gamma rays of 796 keV and 1.365 MeV are measured easily among gamma rays emitted after beta decay of Cs-134. Differences between Cs-133 yields of different fissile nuclides are small.

Europium 153 (Eu-153) is a stable fission product nuclide and it becomes europium 154 (Eu-154) by a neutron capture reaction. Eu-154 decays with a half-life of 8.5 years. Since Eu-153 causes a large resonance capture like U-238, a generation rate of Eu-154 depends on the void fraction.

A generation rate of Eu-154 is approximately proportional to a square of the exposure. It is especially easy to measure a gamma ray of 1.274 MeV among gamma rays emitted by Eu-154 by beta decay. Differences between Eu-153 yields of different fissile nuclides are large. Therefore, the generation rate of Eu-154 is influenced by the composition of the fuel. Thus it is necessary to pay attention that amount of generated Eu-154 is slightly saturated for a high exposure regime because of the large neutron capture cross section.

Cerium 144 (Ce-144) is directly generated during a nuclear fission without any neutron capture reaction and it decays to Pr-144 with a half-life of 284 days by a beta decay. It is particularly easy to measure a gamma ray of 2,186 MeV emitted immediately after beta decay with a half-life of 17.3 minutes. A generation rate of Ce-144 is proportional to the exposure for a low exposure regime, but the rate is saturated for a relatively low exposure because of the short half-life.

Differences between Ce-144 yields of different fissile nuclides are small. Therefore, the generation of Ce-144 depends less on the void fraction. Because it has a short half-life of 284 days, it is preferable to use Ce-144 for the fuel irradiated for a short period and having a small exposure.

It may be worth considering a use of Zr-95 or Nb-95 that has a short half-life if the exposure is low and the cooling time is short.

The reasons why the above-described characteristics can be used for void fraction measurements are described below in detail.

Figure 10:
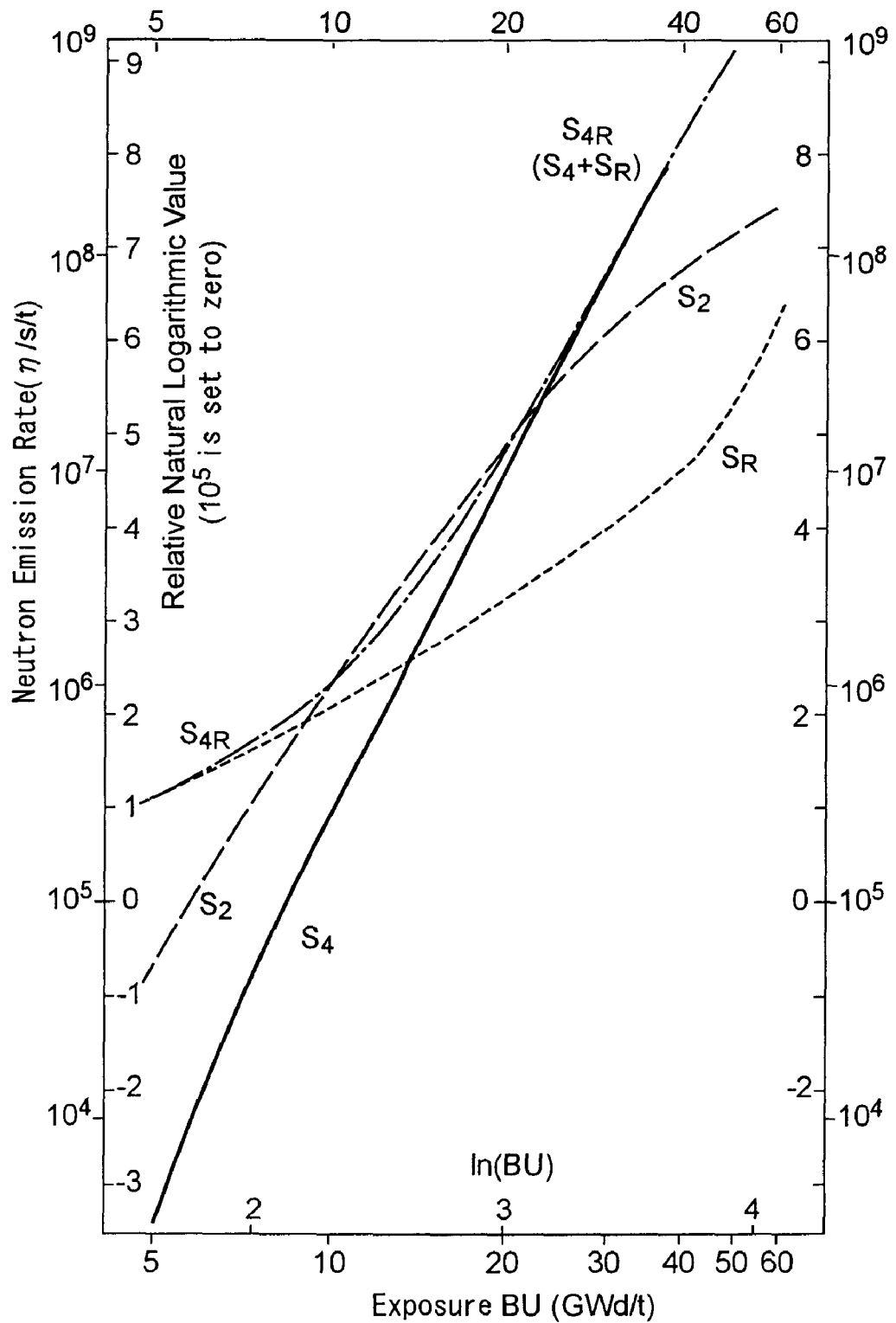
FIG. 10 is a plot illustrating the relationship between a neutron emission rate and an exposure of a BWR fuel assembly calculated by ORIGEN.

FIG. 10 is a plot illustrating the relationship between a neutron emission rate and an exposure of a BWR fuel assembly calculated by ORIGEN. The calculation was performed for an ordinary commercial BWR fuel of 4% enrichment irradiated at 40% of void fraction (void ratio 0.40). Both of the axes of the plot are logarithmic. The period elapsed since the end of irradiation, i.e. the cooling period, is 1 year.

The vertical axis represents a quantity of neutrons emitted from one ton of fuel metal per second. A natural logarithmic values of the neutron emission rates, normalized as the neutron emission rate of $10^5$ equal to zero, are also shown in the plot. The exposure is a thermal power derived in Giga-watt from one ton of fuel metal.

Each curve in the plot includes a part that can be regarded as a straight line within a certain exposure range. The straight part of the neutron emission rate means that the rate is proportional to a power of the exposure in the range. A gradient of the straight part of the curve differs from each other. The difference indicates that the exponent values are different from each other.

Figure 11:
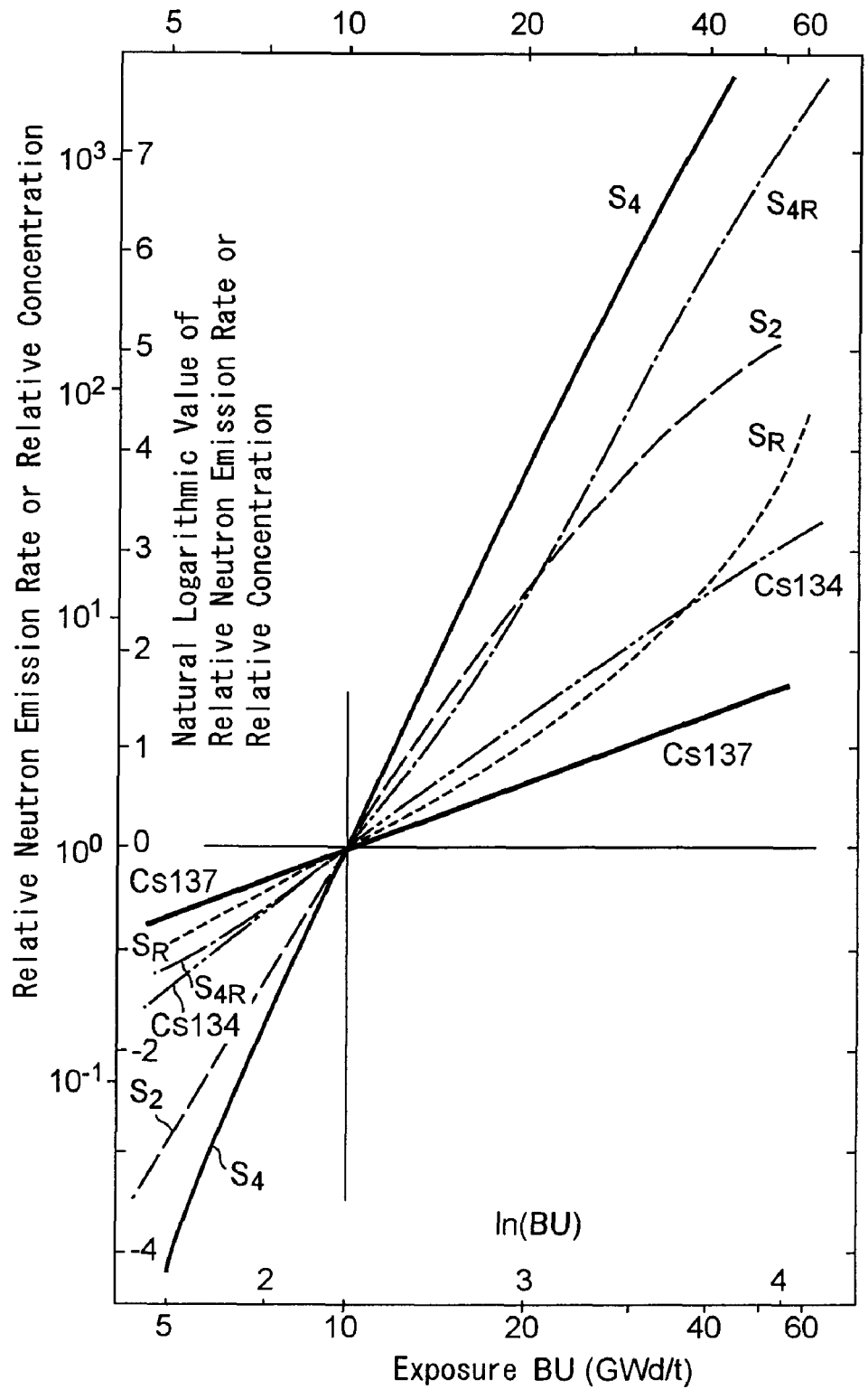
FIG. 11 is a graph showing curves shown in FIG. 10 normalized to the values at the exposure of 10 GWd/t.

FIG. 11 shows curves shown in FIG. 10 normalized to the values at the exposure of 10 GWd/t. In FIG. 11, exposure dependencies of concentrations of gamma ray emitting nuclides relative to the values at 10 GWd/t are also shown. Although not shown in FIG. 11, the curve of Eu-154 is almost identical to that of Cs-134. Because of its long half-life of 30 years (the irradiation period is about 5 years for 60 GWd/t in FIG. 11), the Cs-137 concentration is almost proportional to the exposure. Because the concentration of Cs-137 is almost proportional to the exposure (the exponent value=1.0), it can be seen that the exponents to the exposures of curves except Cs-137 are greater than 1.0.

Figure 12:
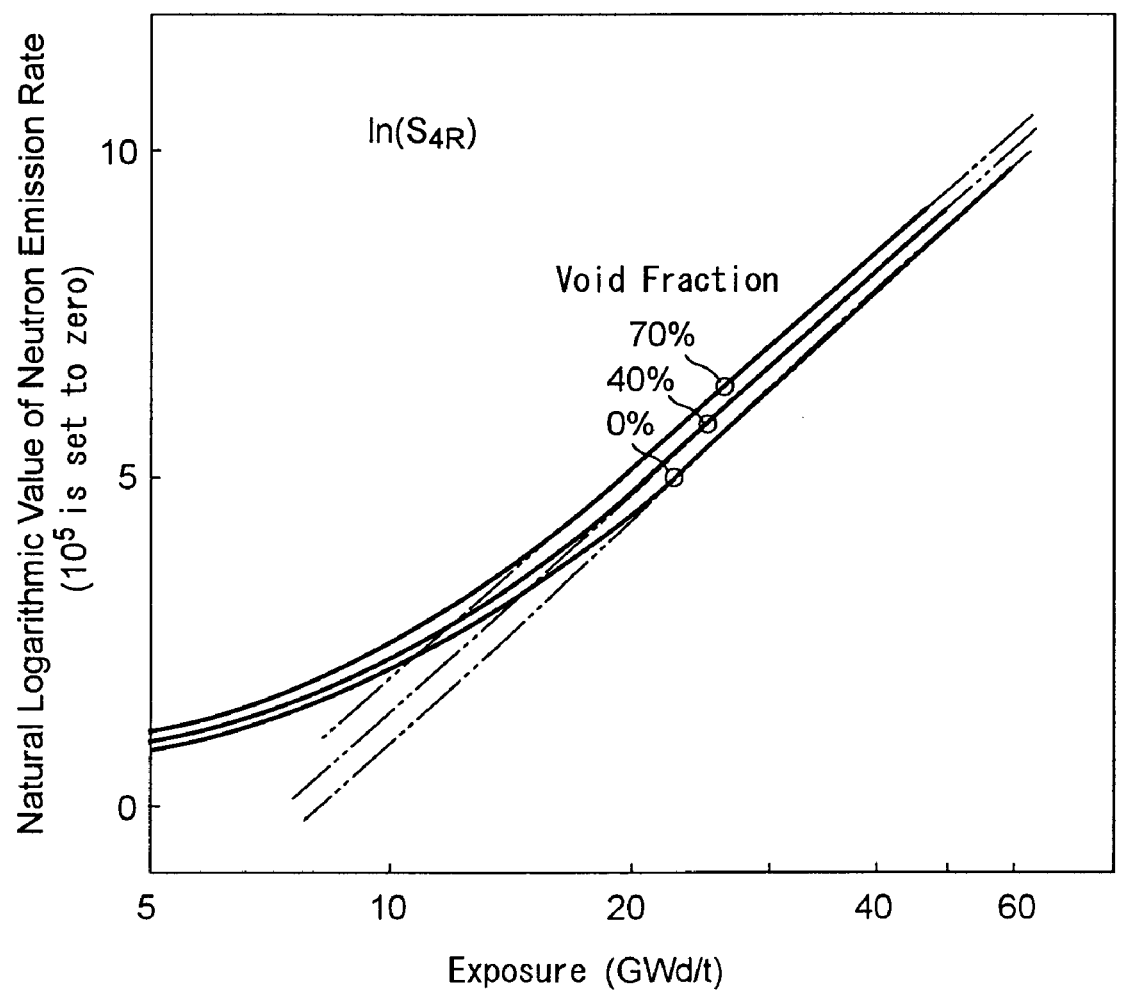
FIG. 12 is a graph illustrating some of the results of a study whether it is possible to evaluate a void fraction by using calculated values by using two curves having different gradients.

FIG. 12 illustrates some of the results of a study whether it is possible to evaluate a void fraction by using calculated values by using two curves (straight lines in terms of their logarithms) having different gradients.

FIG. 12 shows the relationships between natural logarithmic values of the neutron emission rate ($S_{4R}$) of nuclides except Cm-242 in an irradiated fuel after one-year cooling and natural logarithmic values of the exposure. The curves in FIG. 12 are calculated by ORIGEN for different void fractions (0, 40, 70%) using void fraction dependent cross sections.

It can be seen in FIG. 12 that these lines are on straight lines from about 18 GWd/t to about 45 GWd/t and can be approximated as $S_{4R}=a_z \times E^\alpha$ (E: exposure, $a_z$: proportionality constant). A neutron emission rate is higher for a higher void fraction. The value of α at 0% void is 4.9 in the range between 20 GWd/t and 40 GWd/t of exposure.

Since a concentration or an intensity of gamma ray of Cs-137 is proportional to the exposure, it can be expressed that Cs137=$b_z \times E$ ($b_z$: proportionality constant). The exposure can be eliminated from this equation by raising both sides to the power of α and substituting $E^\alpha$ in the equation of $S_{4R}$, i.e., $$a_z = S_{4R} \times (b_z/Cs137)^\alpha.$$

The above equation can be rewritten by using a ratio relative to a reference void fraction (which is assumed to be 0% here for convenience) if the value of $b_z$ can be regarded as a constant for the entire axial position of the fuel assembly ($b_z/b_0=1$), i.e., $$(a_z/a_0)=[S_{4R}/(S_{4R})_0]\times[(Cs137)_0/(Cs137)]^\alpha,$$

where the subscript "0" means that it is a value at a reference position. Thus, the relative value ($a_z/a_0$) can be determined by the two measured ratios in the right term.

On the other hand, this relationship between the relative value and the void fraction can be calculated as a ratio relative to the reference void fraction in each of the curves illustrated in FIG. 12. Thus, it is possible to evaluate a void fraction.

Although it is desirable that the ratio would not be dependent on the exposure, it is slightly dependent on the exposure in reality. Therefore, it is also necessary to estimate the exposure. The exposure needs to be determined as accurately as possible depending on the combination of groups of radio activities as described below.

In general, to measure a void fraction distribution, radio activities are categorized into two groups and they are evaluated.

The first group consists of nuclides of which intensity $A_z$ can be expressed proportional to an exponent of the exposure of the fuel, i.e., $A_z=a_z\times E^\alpha$. The intensity $A_z$ is referred as a first intensity.

The second group consists of nuclides of which intensity $B_z$ can be expressed proportional to the exposure of the fuel, i.e., $B_z=b_z\times E$. The intensity $B_z$ is referred as a second intensity.

As the first group of radio activities, nuclides that are generated by neutron capture reactions of heavy nuclides or that are transmuted from fission products by neutron capture reactions can be used. As the second group of radio activities, nuclides generated by fissions and capturing no neutrons can be used.

$A_z$ and $B_z$ are measured or evaluated at various axial position of the fuel assembly, as well as $A_0$ and $B_0$ corresponding to $S_z$ and $B_z$ at a reference position where the void fraction is known or the void fraction can be evaluated easily, such as a bottom of the fuel assembly where the void fraction is almost 0%. $A_0$ and $B_0$ are expressed as $A_0=a_0\times E^\alpha$ and $B_0=b_0\times E$.

The exposure can be eliminated from the equation of $B_z$ and $B_0$ by raising both sides to the power of $\alpha$ and substituting $E^\alpha$ in the equation of $A_z$ and $A_0$. Finally, the following equation is derived, $$(a_z/a_0)=(A_z/A_0)(B_0/B_z)^\alpha(b_z/b_0)^\alpha.$$

On the other hand, a relationship between ($a_z/a_0$) and a void fraction is evaluated. Based on the relationship and the value of ($a_z/a_0$), a void fraction of the fuel is evaluated.

Figure 13:
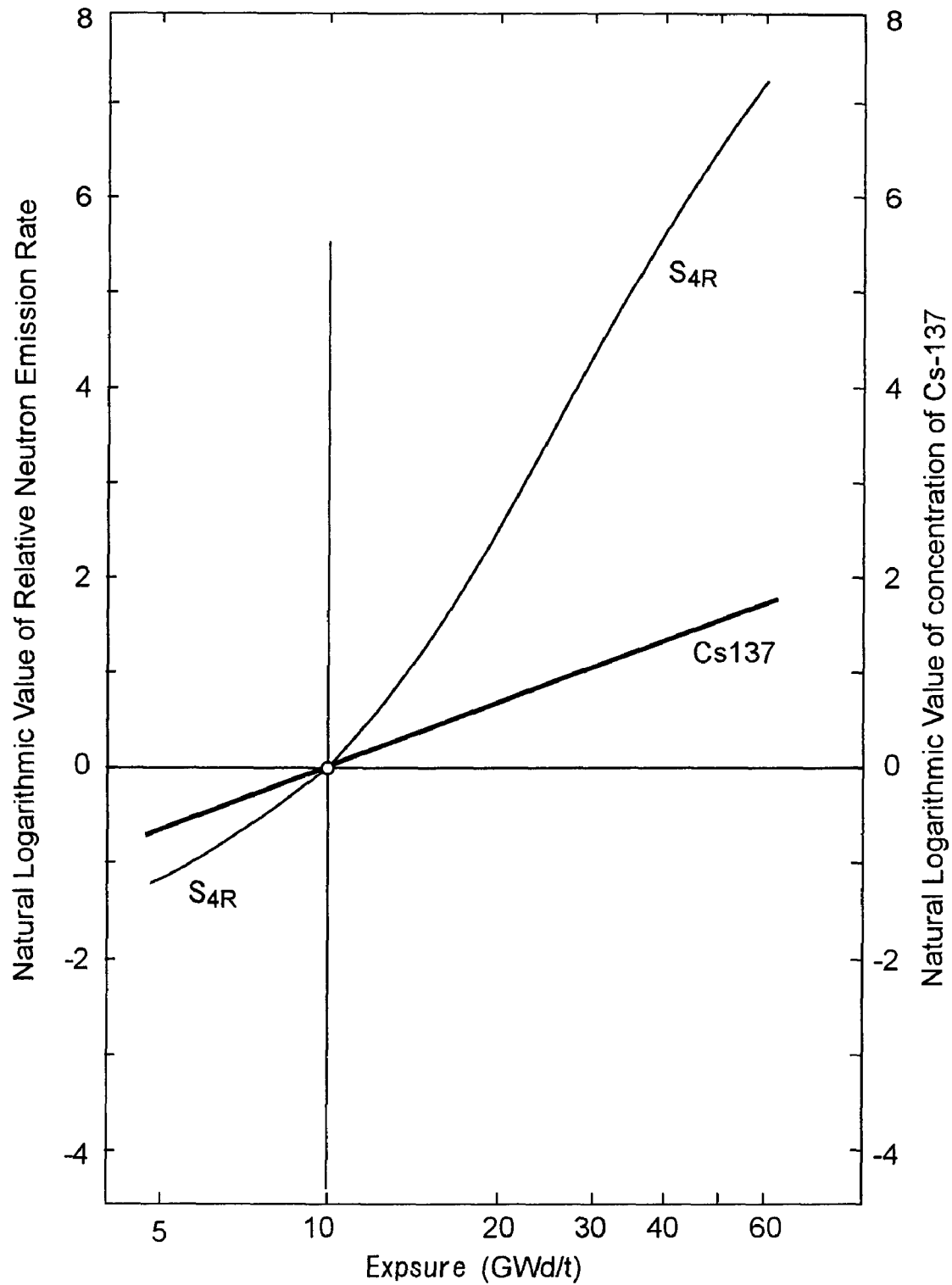
FIG. 13 is a graph showing curves of the ratio of $S_{4R}$ and Cs137 selected from FIG. 11 for a void fraction of 40% corresponding to FIG. 12.

FIG. 13 shows curves of the ratio of $S_{4R}$ and Cs137 selected from FIG. 11 for a void fraction of 40% corresponding to FIG. 12. From FIG. 13, it is understood that this method is applicable to a range of exposure between 20 GWd/t and 50 GWd/t.

Figure 14:
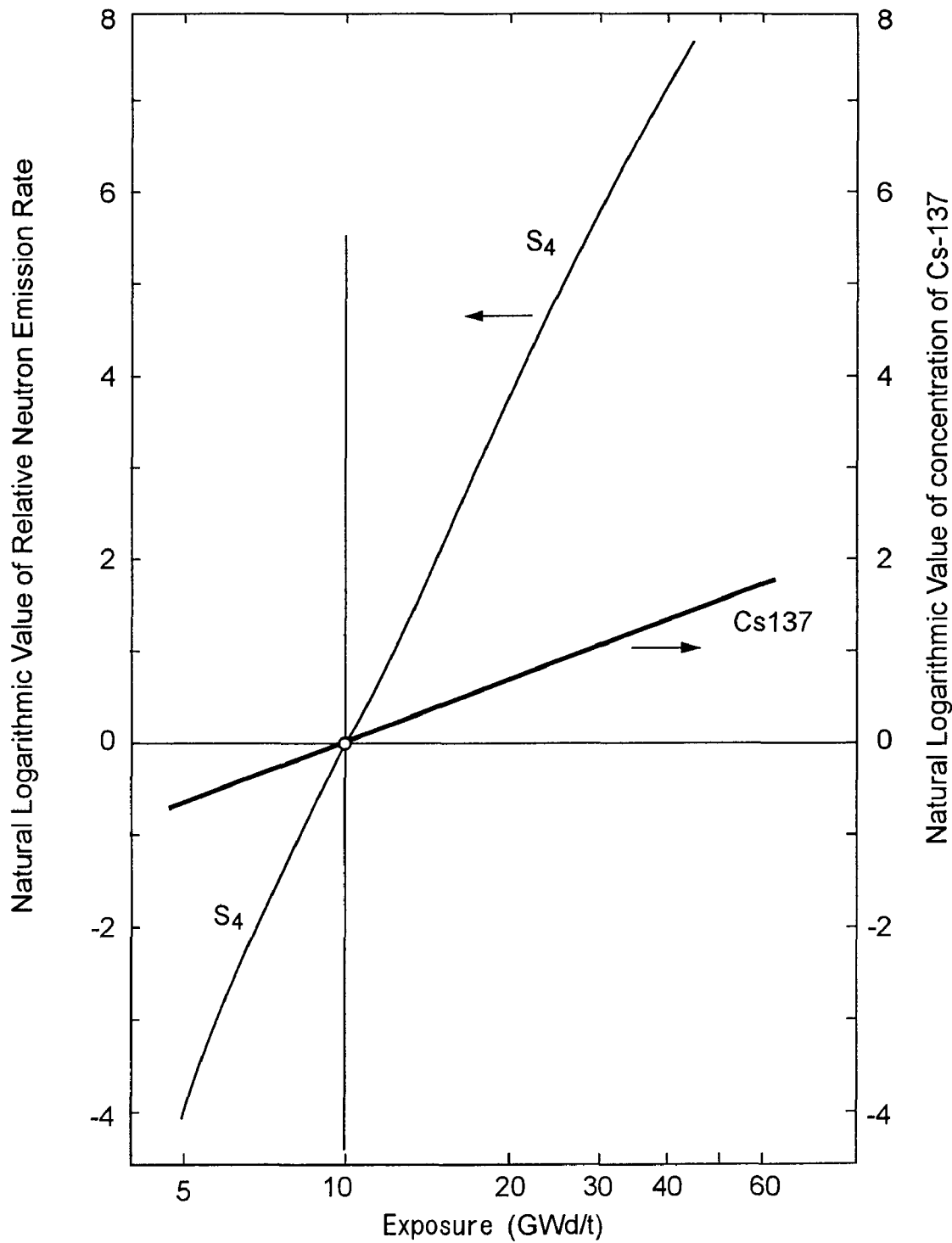
FIG. 14 is a graph illustrating an example of the use of a combination of Cs137 and the neutron emission rate of Cm-244.

FIG. 14 illustrates an example of the use of a combination of Cs137 and $S_4$, i.e., the neutron emission rate of Cm-244. It is convenient that the half-life of Cm-244 is as long as 18.1 years, but this combination would not be preferable for high exposure like $S_{4R}$, nor for a low exposure, for example lower than 15 GWd/t, because it totally disappears in $S_R$. The contribution of $S_R$ has to be removed by calculated within and near the range of 10 to 20 GWd/t.

Figure 15:
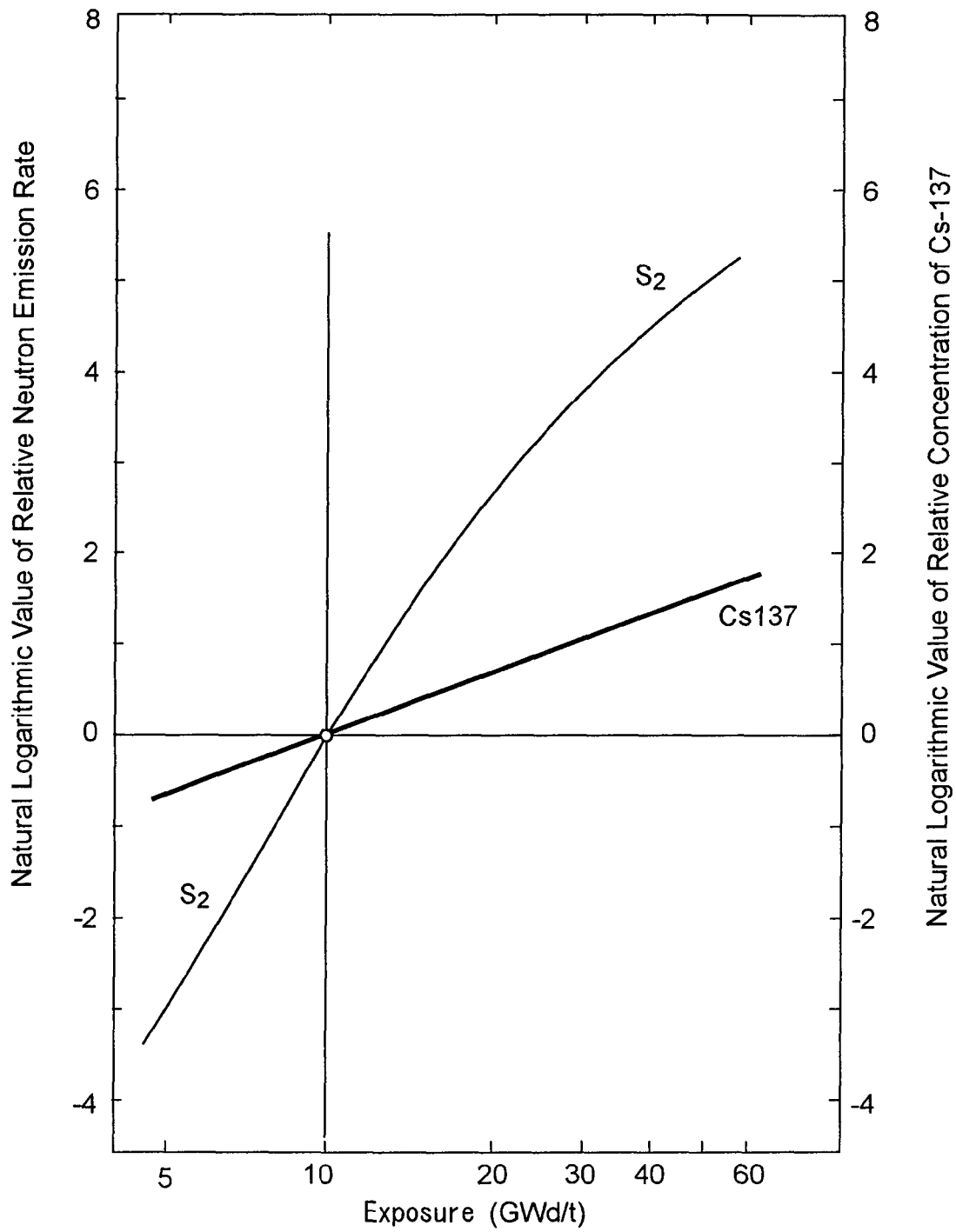
FIG. 15 is a graph illustrating an example of the use of a combination of Cs137 and the neutron emission rate of Cm-242.

FIG. 15 illustrates an example of the use of a combination of Cs137 and $S_2$ i.e., the neutron emission rate of Cm-242. This combination would not be preferable for high exposure, for example higher than 20 GWd/t, because of the short half-life of Cm-242.

Figure 16:
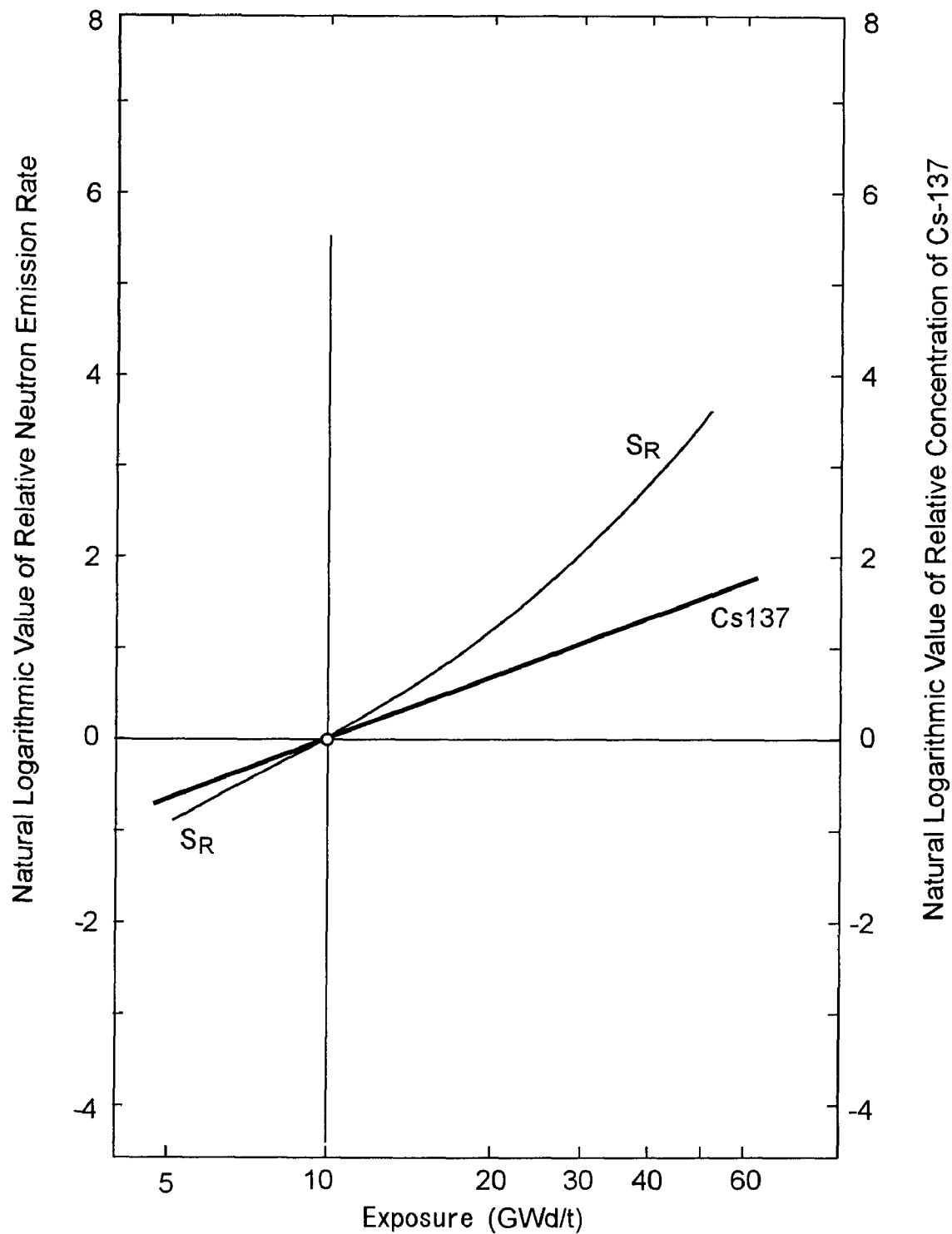
FIG. 16 is a graph illustrating an example of the use of a combination of Cs137 and the neutron emission rate of nuclides except Cm-242 and Cm-244.

FIG. 16 illustrates an example of the use of a combination of Cs137 and $S_R$, i.e., the neutron emission rate of nuclides except Cm-242 and Cm-244. It can be understood from FIG. 11 that it can be used for practical applications only for low exposure, for example lower than about 7 GWd/t, because it is not possible to separate $S_4$ and $S_R$.

Figure 17:
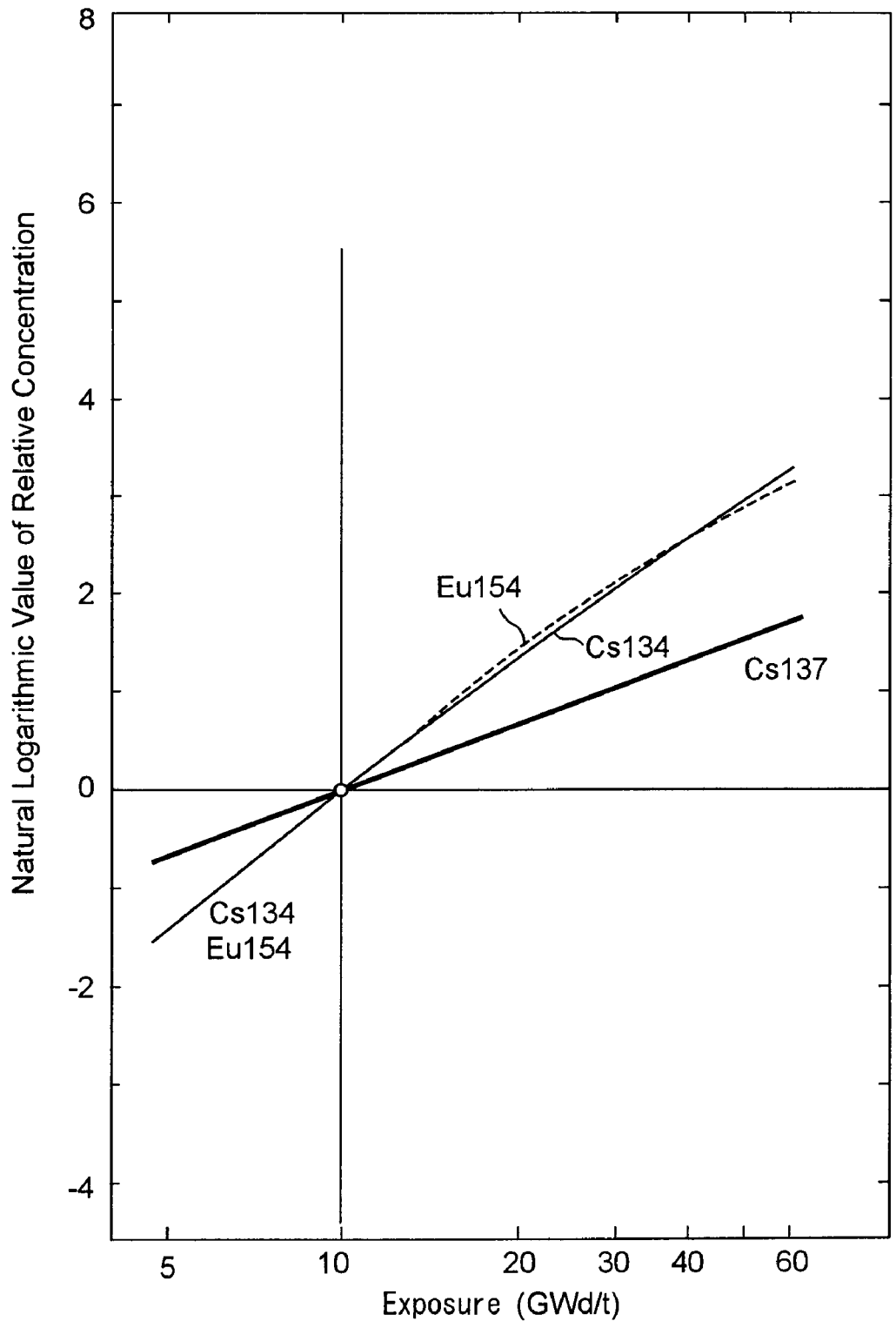
FIG. 17 is a graph illustrating examples of the use of a combination of Cs134 and Cs137 and a combination of Eu154 and Cs137.

FIG. 17 illustrates examples of the use of a combination of Cs134 and Cs137 and a combination of Eu154 and Cs137. Since the half-life of Cs134 is about 2 years, it can suitably be used at or near the exposure of 20 GWd/t that corresponds to an irradiation period of about 2 years. Eu-154 has a long half-life and a part of Eu-154 becomes Eu-155 because of a large neutron capture cross section as the exposure increases. So, the increase of Eu154 is saturated and some corrections may be required to apply Eu154 to a high exposure.

Figure 18:
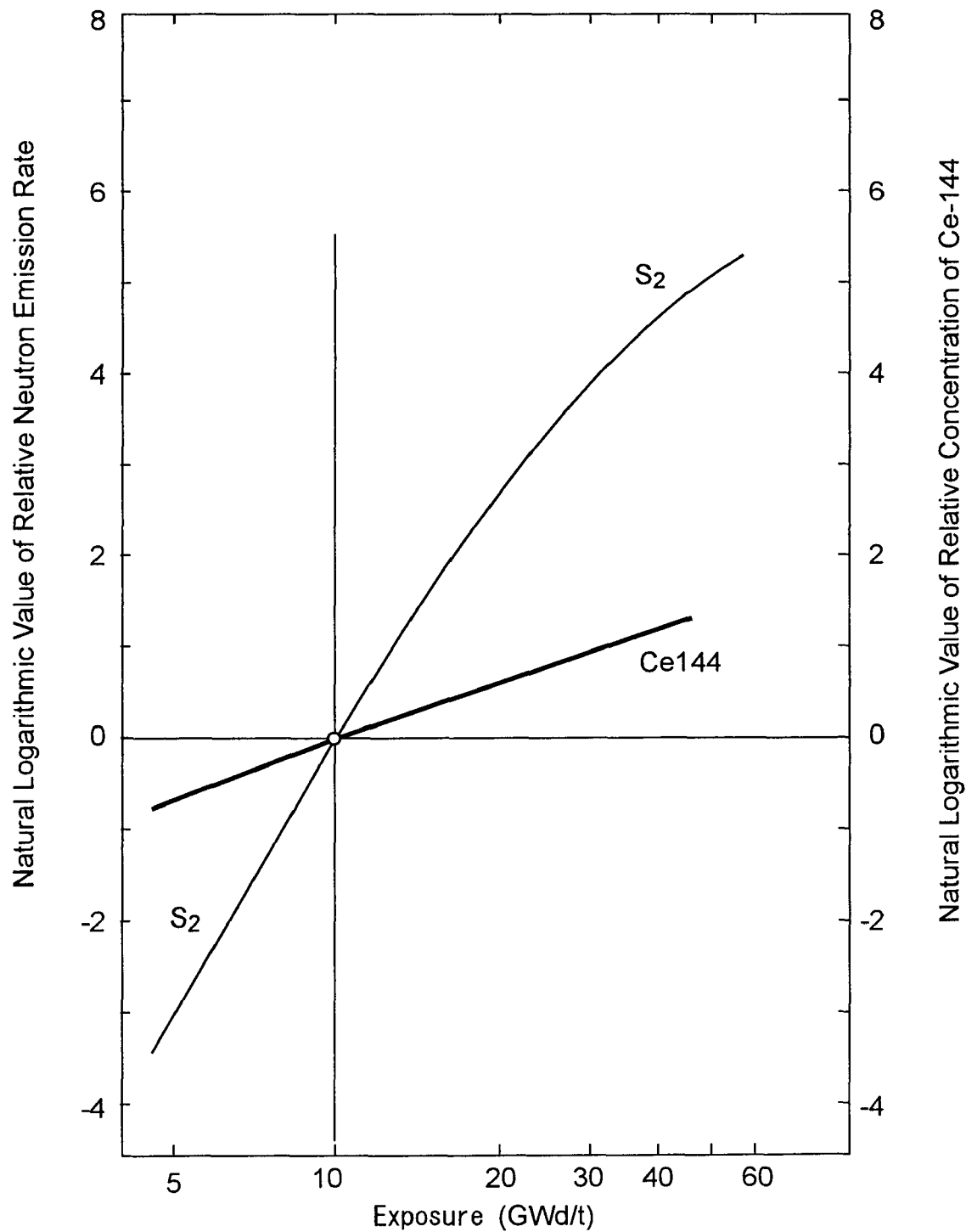
FIG. 18 is a graph illustrating an example of the use of in place of Cs137 in FIG. 15.

FIG. 18 illustrates an example of the use of Ce144 in place of Cs137 in FIG. 15. A preferable cooling period is not so long if the exposure is low. However, the accuracy of measurement of Cs137 may be poor in such a situation. Therefore, it may be advantageous to use Ce144 having a half-life that is not so long because it can be handled relatively easily for gauging.

Figure 19:
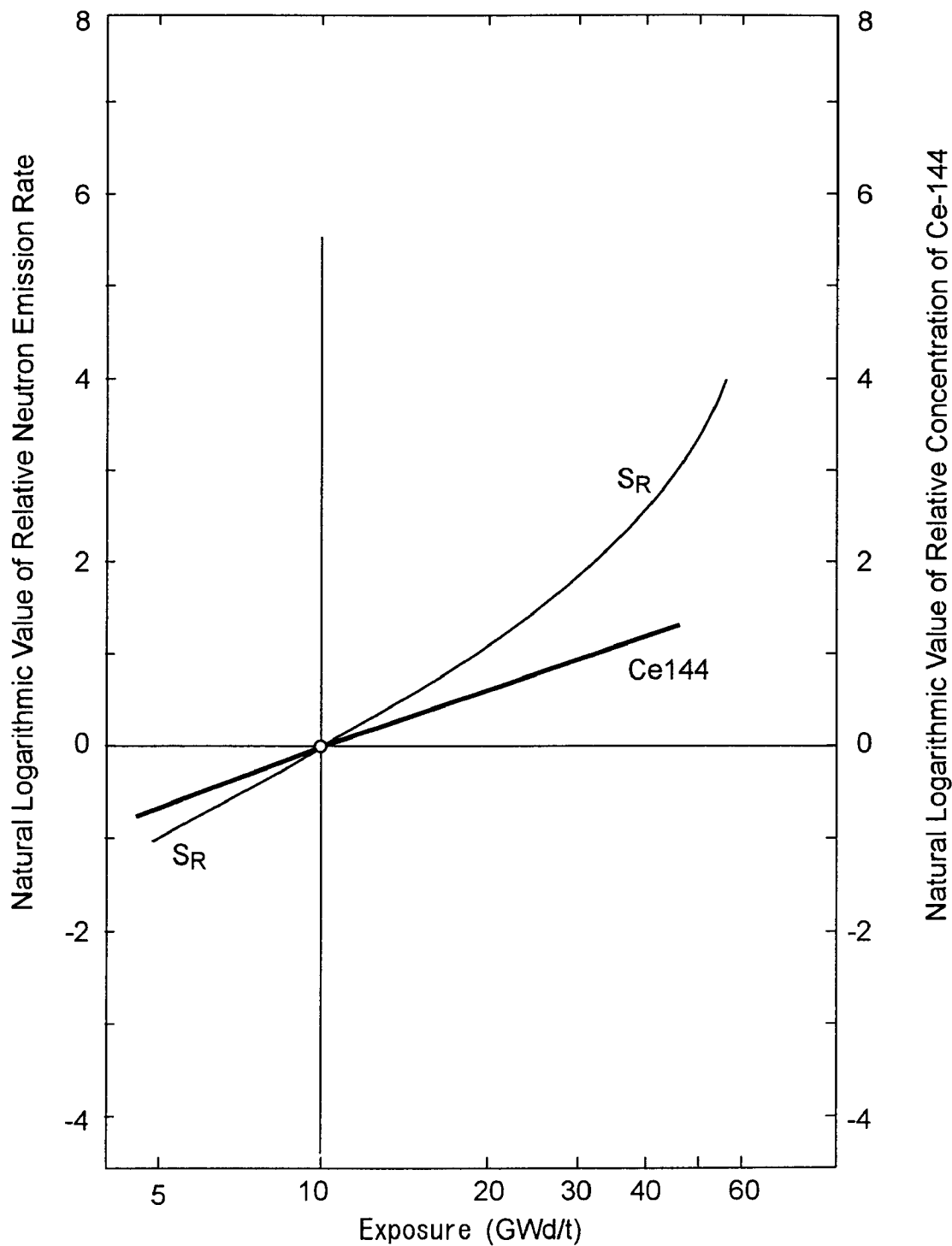
FIG. 19 is a graph illustrating an example of the use of in place of Cs137 in FIG. 16.

FIG. 19 illustrates an example of the use of Ce144 in place of Cs137 in FIG. 16. As described above, a preferable cooling period is not so long if the exposure is low. However, the accuracy of measurement of Cs137 may be poor in such a situation. Therefore, it may be advantageous to use Ce144 having a half-life that is not so long because it can be handled relatively easily for measurement as in the case of FIG. 18.

Figure 20:
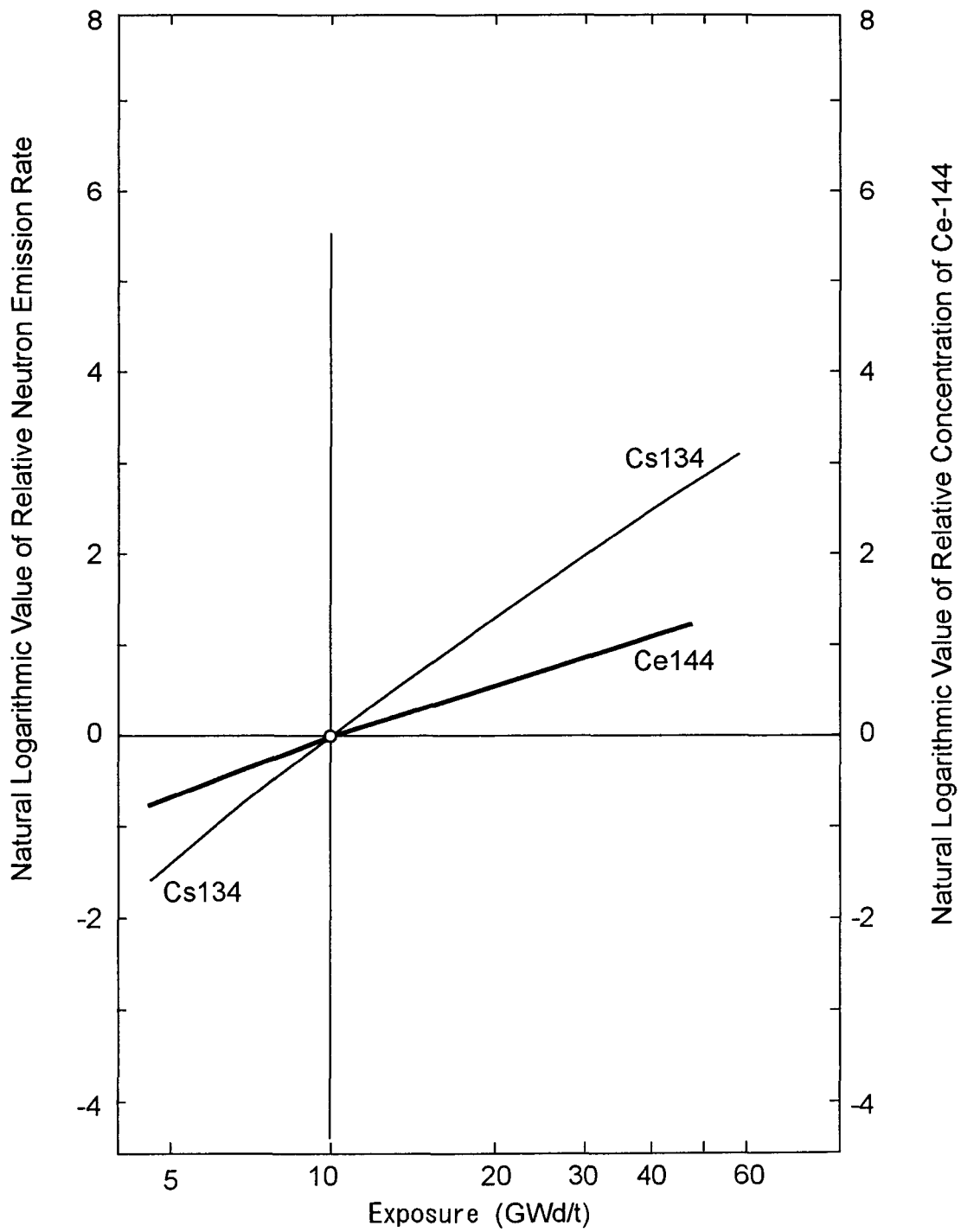
FIG. 20 is a graph illustrating an example of the use of in place of Cs137 in FIG. 17.

FIG. 20 illustrates an example of the use of Ce144 in place of Cs137 in FIG. 17. Eu154 is excluded from this example because accuracy of measurement may be significantly poor if the exposure is low and the cooling time is short.

FIGS. 21 through 25 show dependencies of the values corresponding to the void fraction relative to zero void fraction ($a_z/a_0$) on the exposure. It can be seen that the sensitivity to void fraction is high if the value is high. From a viewpoint of dependency on the exposure, horizontally flat curves mean that no information is required on the exposure for the application. On the other hand, if the curves wind mildly, it means that only rough estimation of the exposure is necessary. If the curve wind sharply, it means that the exposure needs to be estimated with accuracy.

Figure 21:
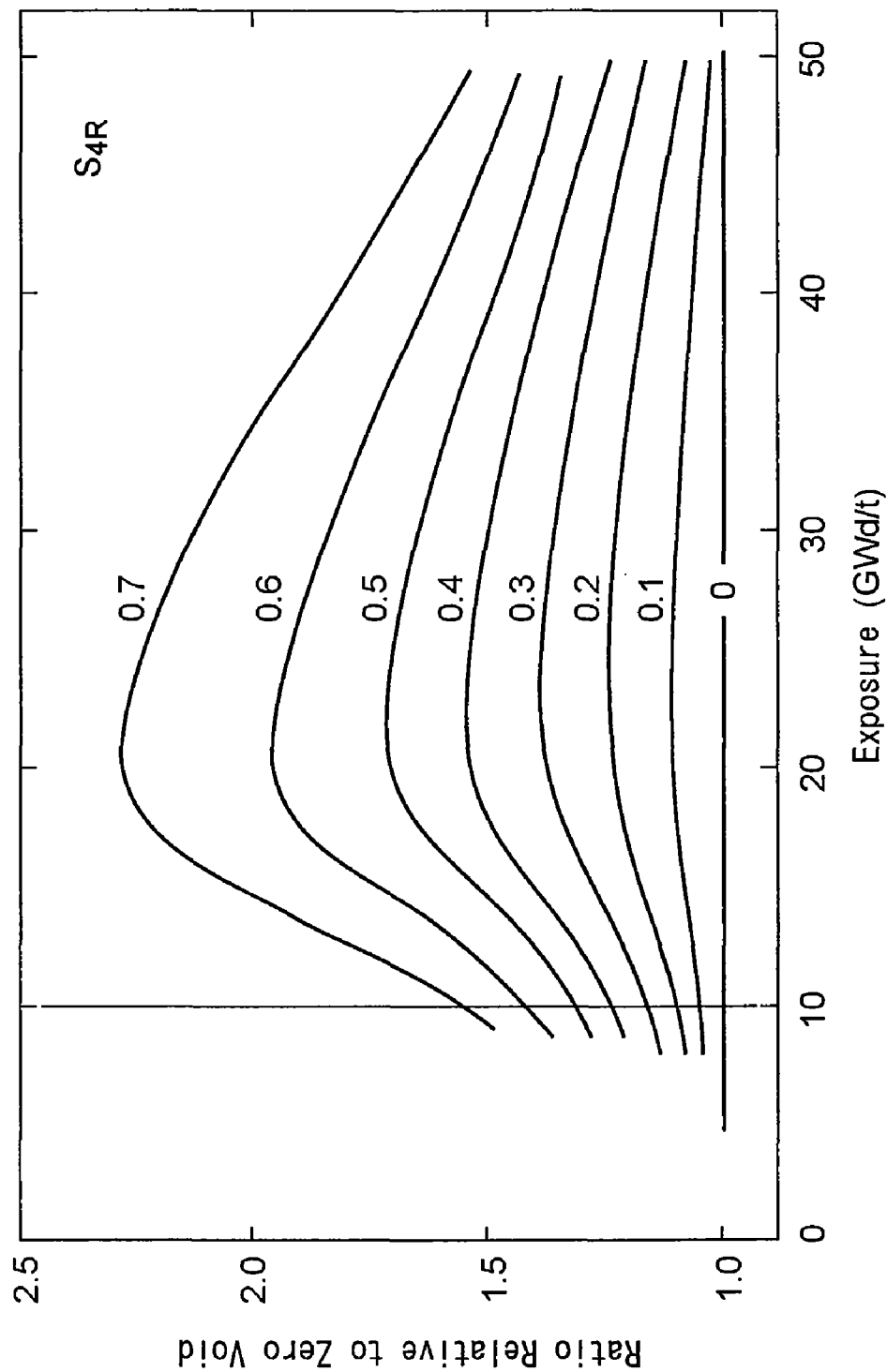
FIG. 21 is a graph illustrating an example of the use of $S_{4R}$.

FIG. 21 illustrates an example of the use of $S_{4R}$. It shows that the sensitivity to void fraction is appropriate if the exposure is higher than about 18 GWd/t and very rough information on the exposure is required in and near the range of 18 through 30 GWd/t.

Figure 22:
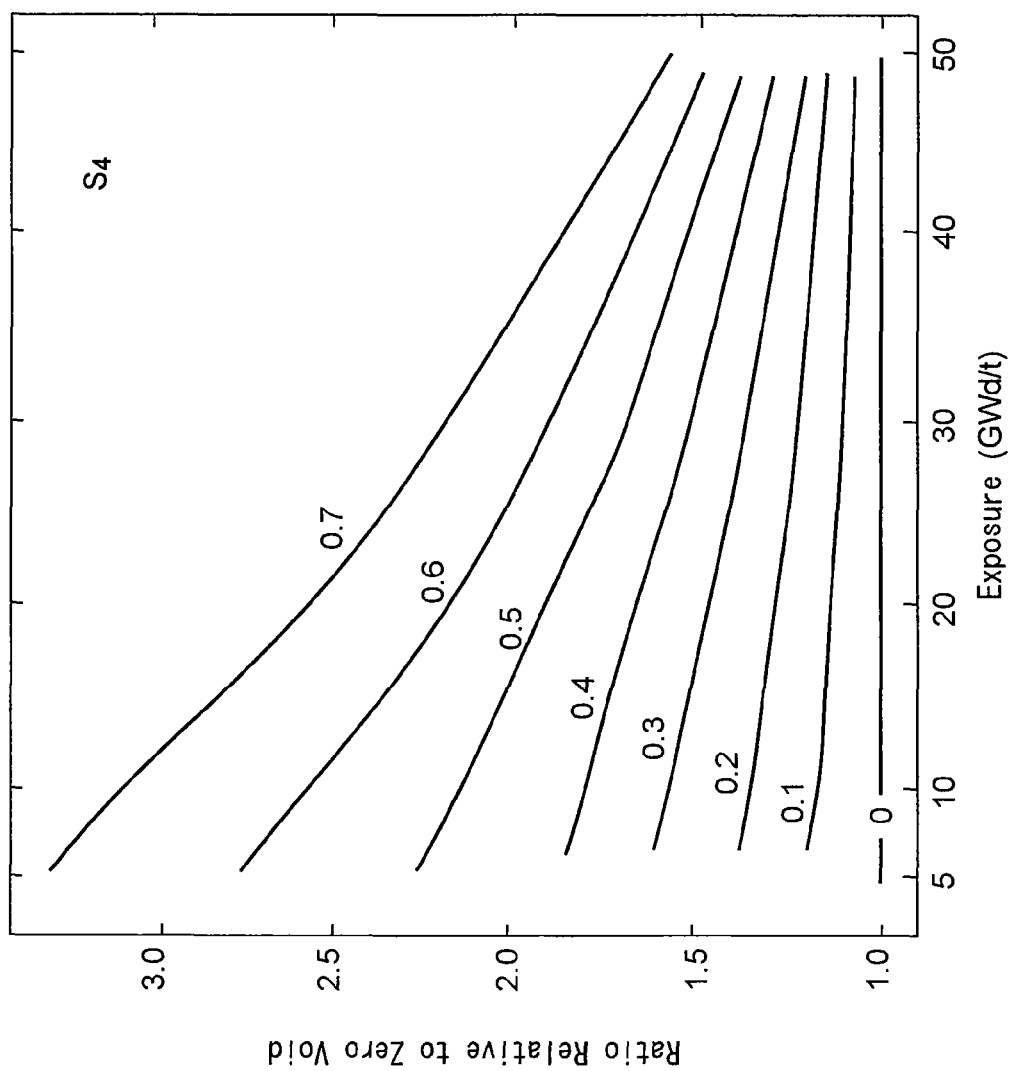
FIG. 22 is a graph illustrating an example of the use of $S_4$.

FIG. 22 illustrates an example of the use of $S_4$. Considering the fact that $S_4$ may be hidden by $S_R$ and hence cannot be utilized if the exposure is low, it makes little difference with the use of $S_{4R}$.

Figure 23:
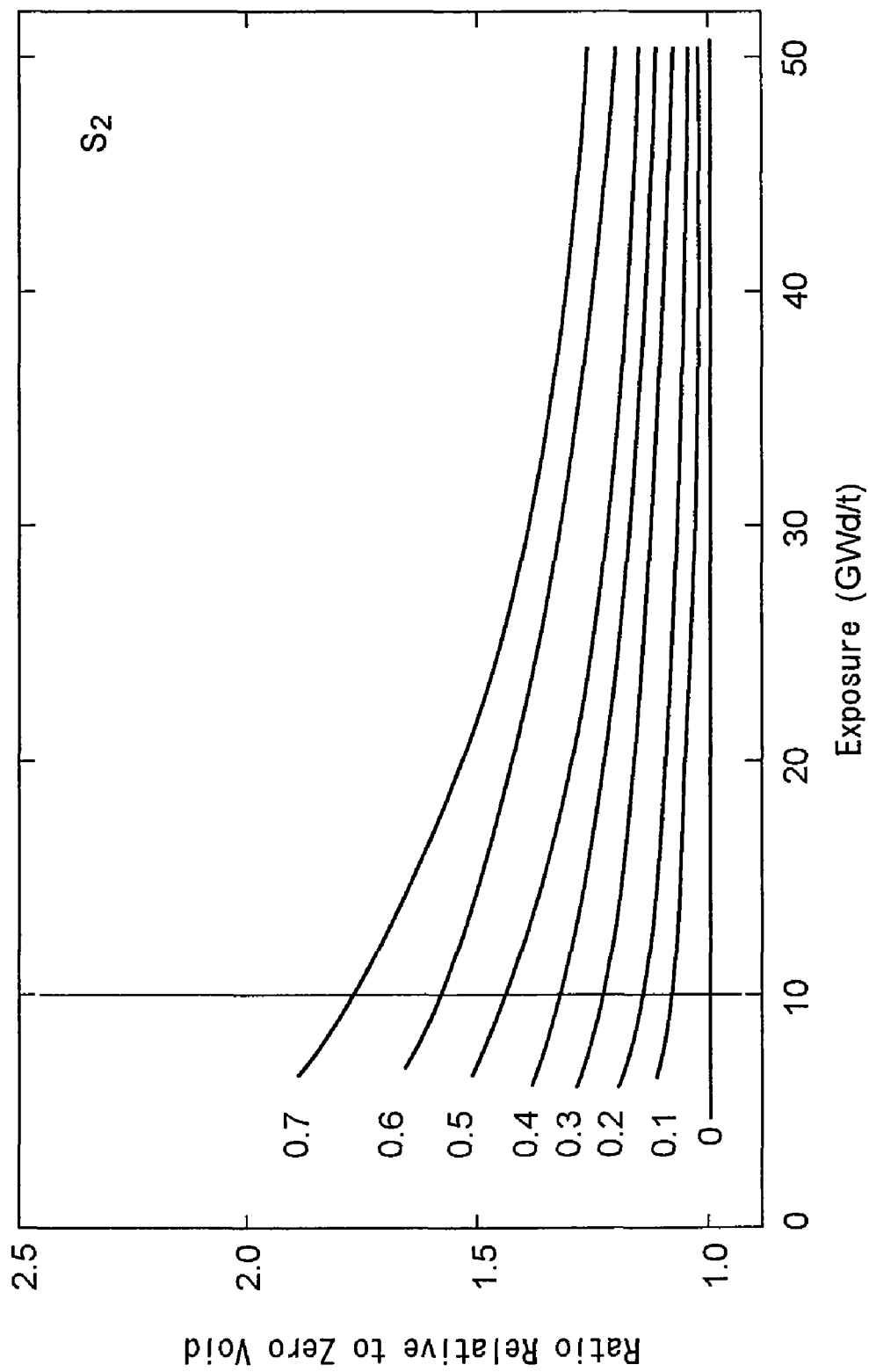
FIG. 23 is a graph illustrating an example of the use of $S_2$.

FIG. 23 illustrates an example of the use of $S_2$. It shows that the exposure is required to be accurate to a certain extent because the exposure is required to be smaller than 20 GWd/t.

Figure 24:
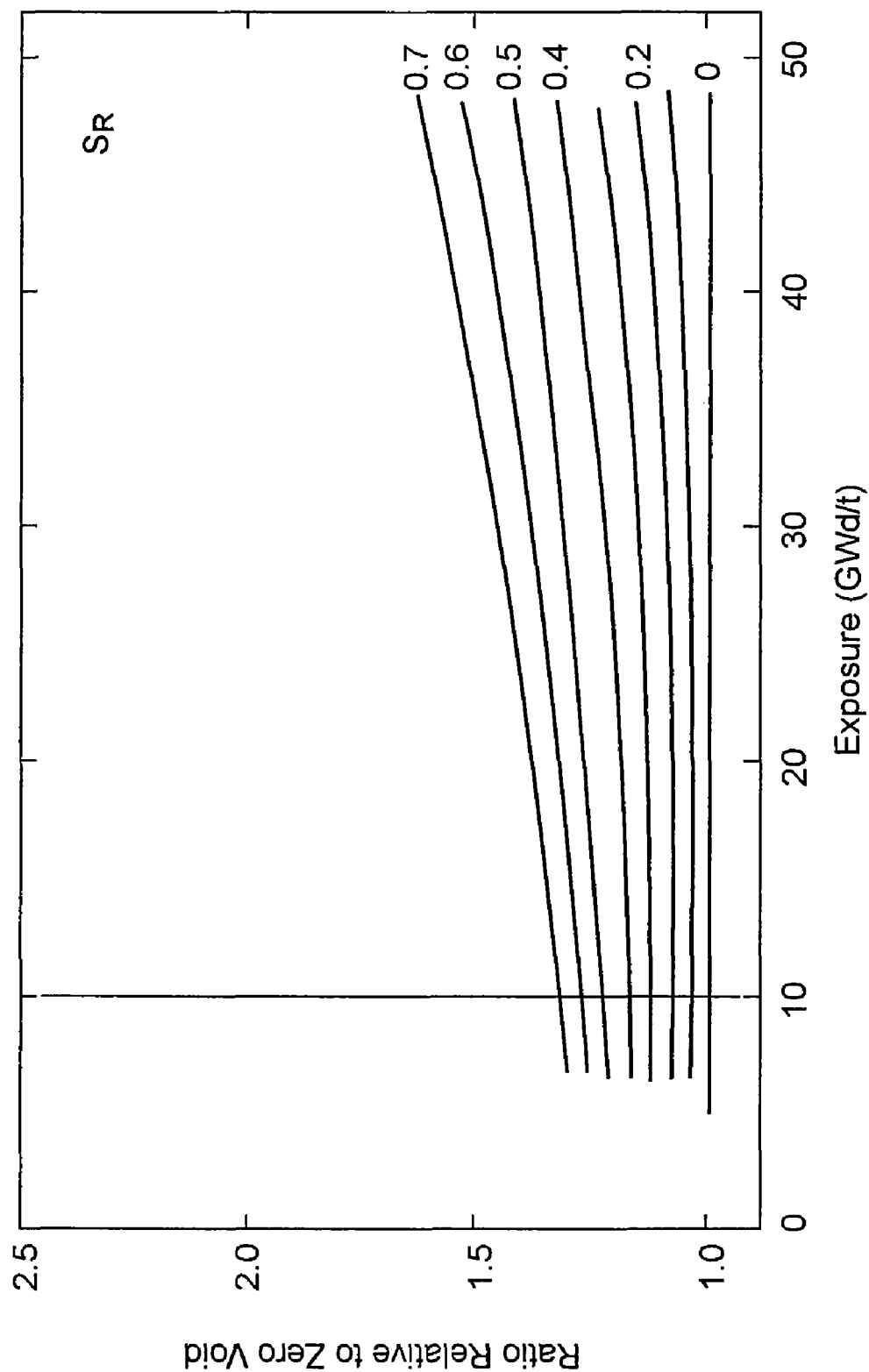
FIG. 24 is a graph illustrating an example of the use of $S_R$.

FIG. 24 illustrates an example of the use of $S_R$. If the exposure is low, $S_2$ and $S_R$ can be separated from each other by two or more neutron measurement sessions for different cooling periods. The value of $S_4$ is small and hence can be corrected by calculations. So $S_R$ is convenient for measurement. However, the use of $S_4$ is accompanied by a problem of low sensitivity relative to voids. No accurate information on the exposure is required.

Figure 25:
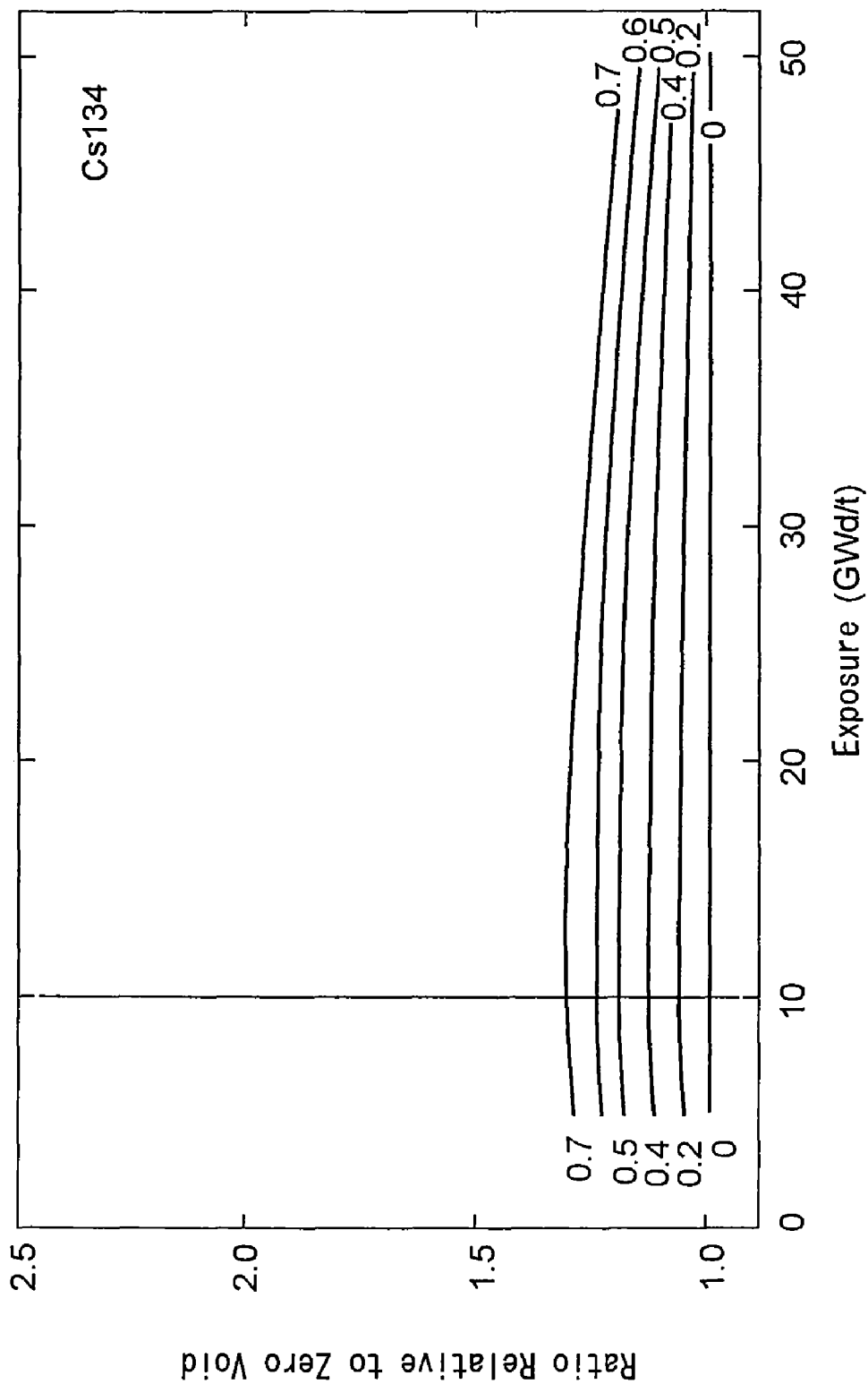
FIG. 25 is a graph illustrating an example of the use of Cs134.

FIG. 25 illustrates an example of the use of Cs134. The sensitivity of the exposure dependency is generally low, and only rough information is required for the exposure. The use of Cs134 is accompanied by a problem of low sensitivity.

Some embodiments of the present invention are described below. Since background of the procedures employed is described in detail above, the following description of the embodiments are focused on the procedures.

FIRST EMBODIMENT

Figure 1:
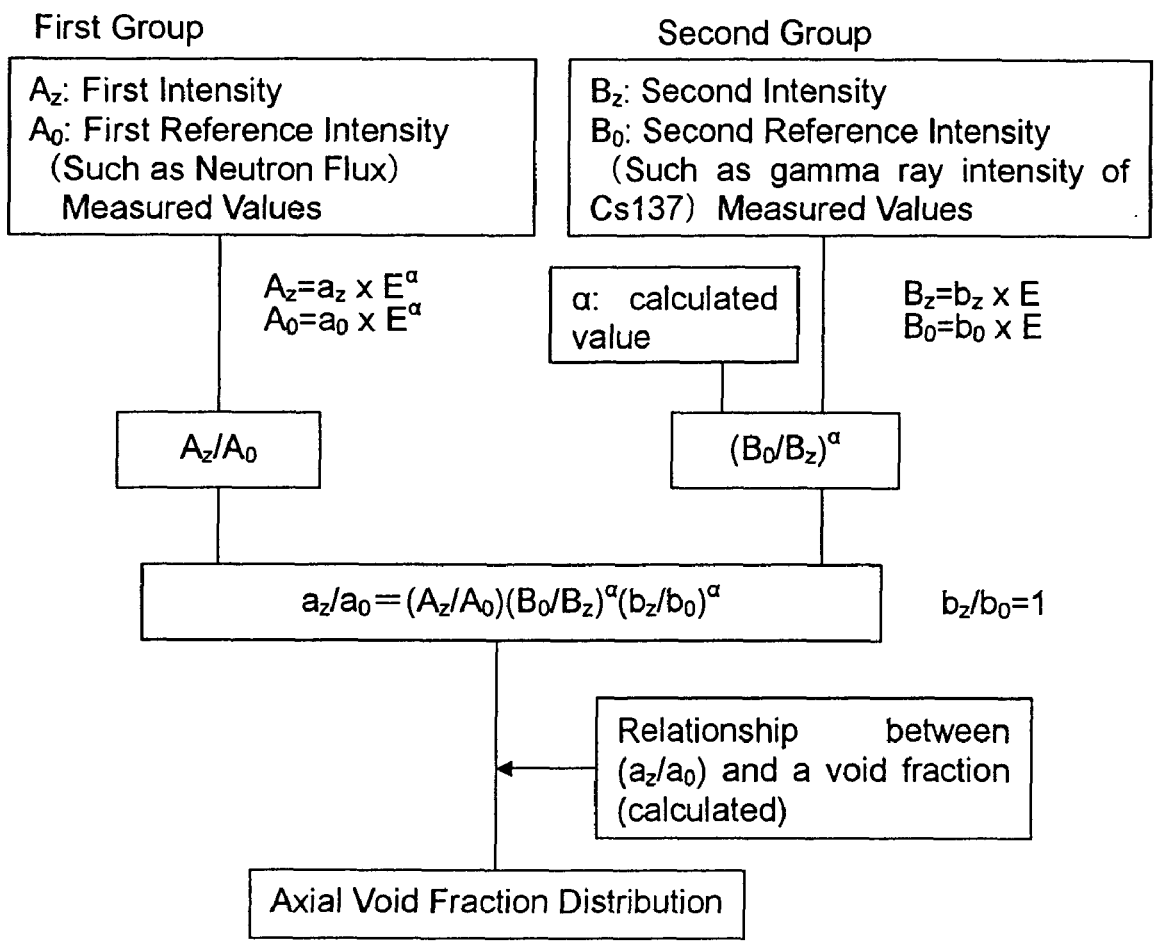
FIG. 1 is a flow chart of an axial void fraction distribution measurement method according to the first embodiment of the present invention.

FIG. 1 is a flow chart of an axial void fraction distribution measurement method according to the first embodiment of the present invention.

In this embodiment, as the first intensity $A_z$, a neutron emission rate $S_z$ and $S_0$ expressed as $S_z=a_z \times E^\alpha$ or $S_0=a_0 \times E^\alpha$ is used. And as the second intensity $B_z$ and $B_0$, gamma ray intensity $\gamma_z$ and $\gamma_0$ expressed as $\gamma_z=g_z \times E^\alpha$ or $\gamma_0=g_0 \times E^\alpha$ is used.

Then, the ratio $(a_z/a_0)$ is expressed as;

$$(a_z/a_0)=(S_z/S_0)(\gamma_0/\gamma_z)^\alpha(g_z/g_0)^\alpha.$$

Based on the value of $(a_z/a_0)$ and the relationship between $(a_z/a_0)$ and a void fraction evaluated otherwise, a void fraction of the fuel is evaluated.

Also a correlation function representing a relationship between $(a_z/a_0)$ and a void fraction is derived from computations. The void fraction experienced at each axial position of the fuel assembly, i.e., the void fraction distribution is obtained from this correlation function and $(a_z/a_0)$ derived from the first and second intensities of the radioactive rays.

Usually the proportionality constant $g_z$ does not practically vary at different axial positions of a fuel assembly ($g_z/g_0=1$). However, it may slightly vary depending on the fuel design. For such a case, it is necessary to correct the gamma ray shielding effect of the fuel rod by calculations.

The value of $(S_z/S_0)$ can be determined from the value of $(\phi_z/\phi_0)$. To be rigorous, the value of $\phi_z/\phi_0$ has to be corrected in terms of the contribution to the axial variation of the neutron multiplication factor. However, the value is rather small relative to $(\phi_z/\phi_0-1)$ in a BWR fuel assembly if the contribution is disregarded, and the variation in the multiplication factor is about 10 to 20% thereof. Therefore, no problem actually arises if $(S_z/S_0)$ is approximated as $(\phi_z/\phi_0)$.

Generally, the active part of a BWR fuel assembly is equally divided into 24 nodes and each node is referred to as node 1, 2, 3, ..., 24 from the lower end (the upstream of cooling water). It is known that the void fraction is practically equal to 0% in nodes 2 and 3, and 70 to 75% in nodes 23 and 24 near the upper end. The shape of the void fraction distribution in the vertical direction of the core in the reactor varies depending on the operation of the reactor or as the exposure increases.

The average void fraction distribution of the entire irradiation period is evaluated if the half lives of the radio activities to be measured are long. On the other hand, the void fraction distribution shortly before the end of the operation of the reactor is evaluated if the half lives of the radio activities to be measured are short. In this embodiment, if $S_{4R}$ and Cs137 are used for a measurement of an irradiated fuel assembly, since both of them have a long half-life, the average void fraction distribution of the entire burning period is measured.

SECOND EMBODIMENT

Figure 2:
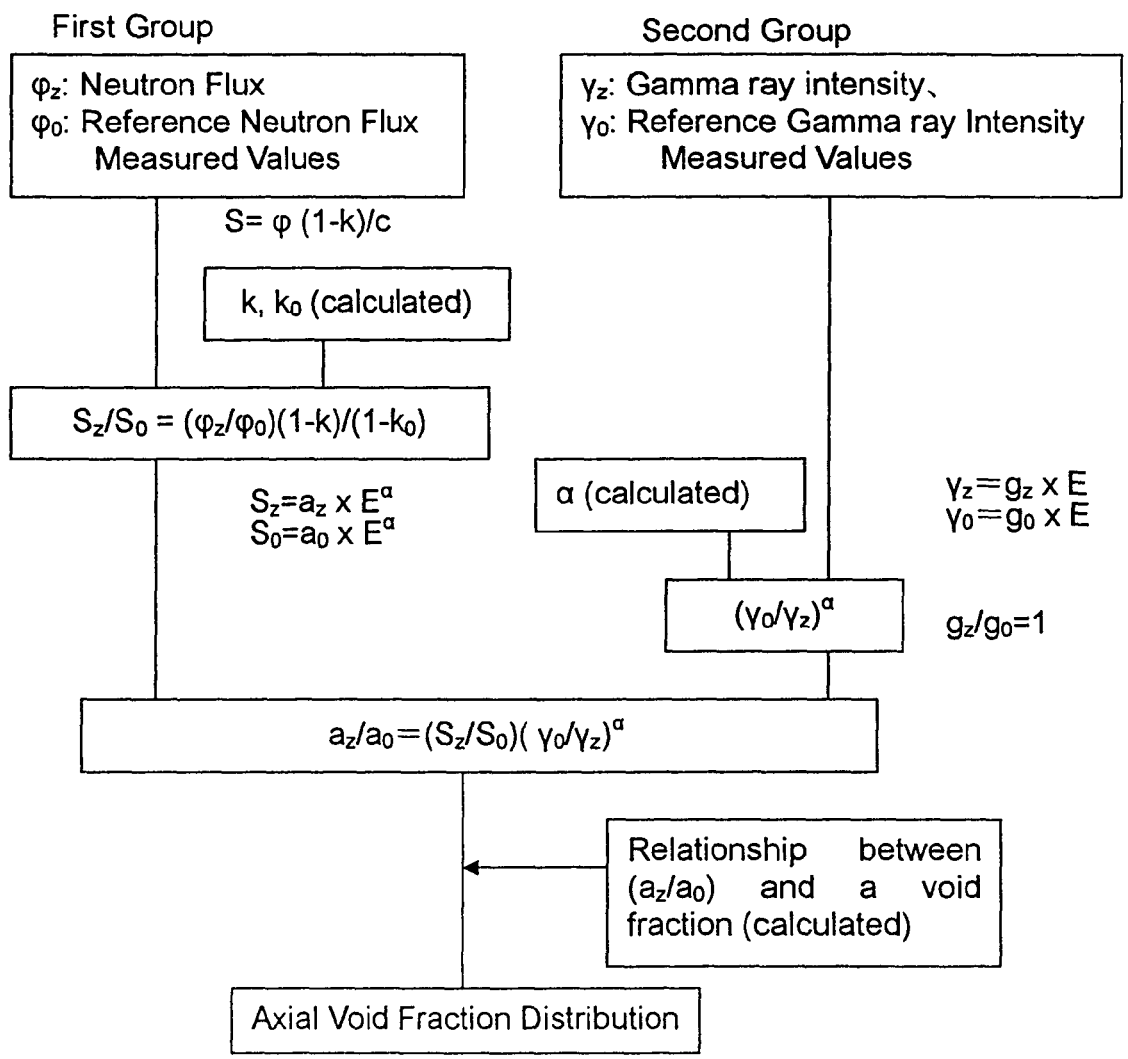
FIG. 2 is a flow chart of an axial void fraction distribution evaluation method according to the second embodiment of the present invention.

FIG. 2 is a flow chart of an axial void fraction distribution evaluation method according to the second embodiment of the present invention.

This embodiment is different from the first embodiment in a point that the values of $(\phi_z/\phi_0)$ are corrected for the contribution of the axial variation of the neutron multiplication factor by a standard neutron multiplication factor distribution obtained from the design calculations.

As described above, the effect is rather small relative to $(\phi_z/\phi_0-1)$ in a BWR fuel assembly so that no problem arises even if the value obtained by the design calculation is used, because the effect of the neutron multiplication factor is about 10 to 20%. It is well known that the neutron flux or neutron counting rate ($\phi$) has a relationship of $\phi=c\,S/(1-k)$, where k is a neutron multiplication factor, S is a neutron emission rate, and c is a proportionality constant. This relation is used in this embodiment.

The proportionality constant (c) can be determined for example by using a fixed source calculation method that solves a neutron transport diffusion equations with a given neutron source to determine a neutron flux at a target position. A neutron flux for an imaginary condition of no neutron multiplication ($\phi_{NM}$: No Multiplication) and a neutron flux for an actual condition of a certain neutron multiplication ($\phi_M$: Multiplication) are evaluated and the neutron multiplication factor k by using the ratio of the both neutron fluxes. From the neutron flux $\phi$, the neutron multiplication factor k and the relationship $\phi=c\,S/(1-k)$, the proportionality constant c is derived. S is a know value because it is an input of a calculation of the fixed source calculation method.

THIRD EMBODIMENT

Figure 3:
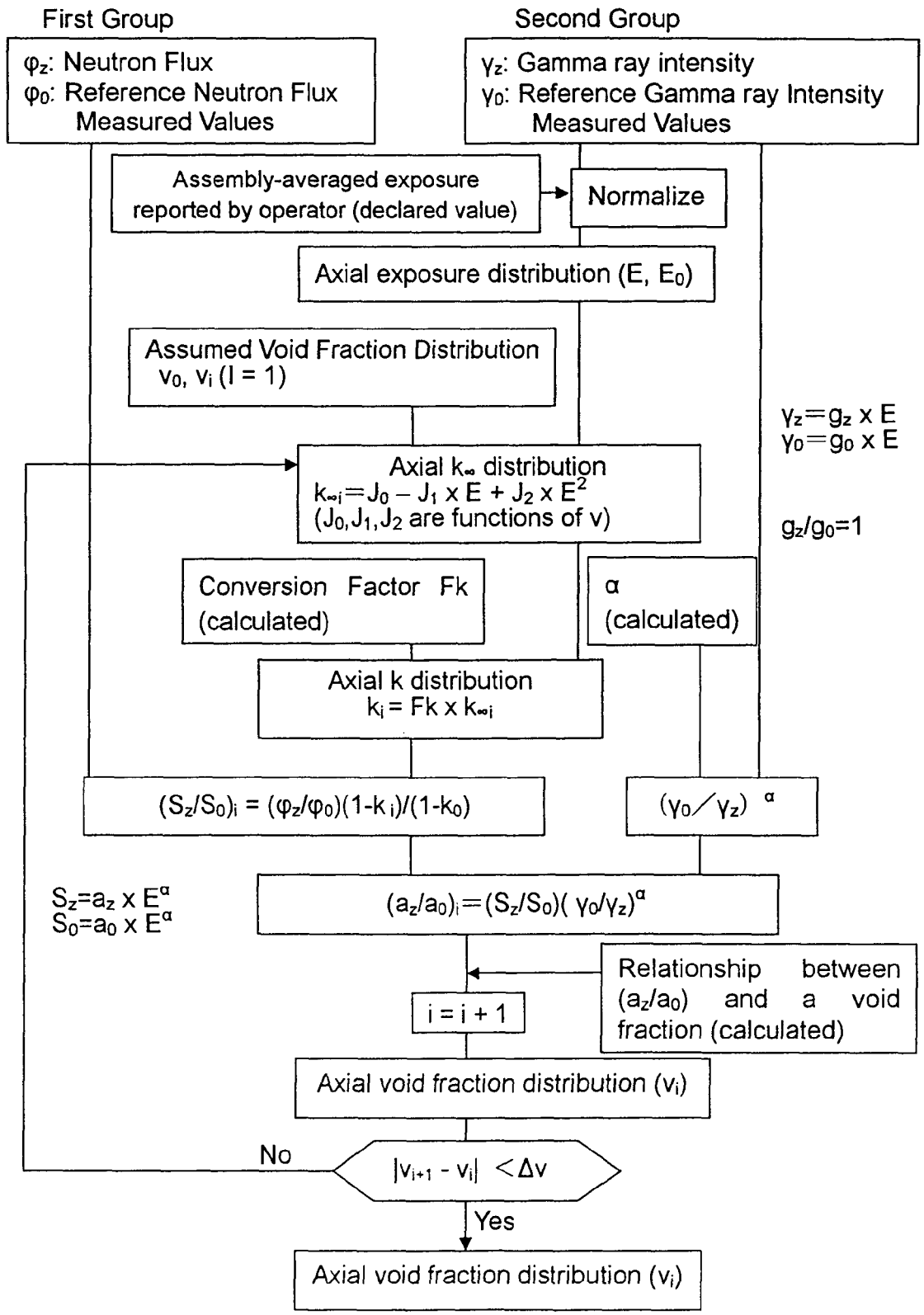
FIG. 3 is a flow chart of an axial void fraction distribution evaluation method according to the third embodiment of the present invention.

FIG. 3 is a flow chart of an axial void fraction distribution evaluation method according to the third embodiment of the present invention.

A difference of this embodiment from the second embodiment is that $(\phi_z/\phi_0)$ is corrected for the contribution of an axial variation of the neutron multiplication factor based on a fuel assembly averaged exposure that seems to be available most easily from the operator of the reactor.

This method of determining a neutron multiplication factor (k) comprising the steps of correcting an estimated void fraction distribution by measured values repeatedly, determining the infinite multiplication factor ($k_\infty$) that depends on the exposure and corresponds to the void fraction, and then determining k.

The procedure of this embodiment is described in detail below.

An axial neutron flux (or the axial neutron counting rate) distribution and a gamma ray intensity distribution, as well as $(\gamma_0/\gamma_z)^\alpha$ can be determined as described for the first and the second embodiments. It is not so simple to determine $(S_z/S_0)$ from $(\phi_z/\phi_0)$. But, it has been found that the factor for correcting the neutron multiplication factor variation can be determined by repeated calculations (can be converged by repeated calculations) because the factor for correcting the neutron multiplication factor variation is rather small relative to $(\phi_z/\phi_0-1)$.

An axial exposure distribution (E) can be evaluated by normalizing the average value of axial gamma ray intensity distribution (Cs137 distribution in particular) to the average exposure of the fuel assembly reported by the operator of the reactor ("operator-declared average exposure"). The neutron multiplication factor (k) can be obtained by multiplying the infinite multiplication factor ($k_\infty$) by a computationally evaluated constant (Fk). However, the value of ($k_\infty$) is influenced by the cooling water void fraction during irradiation.

Before describing the procedures illustrated in FIG. 3, ($k_\infty$) and (Fk) are described. Because it might be confusing that no void is found at room temperature in this embodiment but certain voids exist in and around the fuel assembly at high temperature under high pressure during irradiation.

At a condition of high temperature and high pressure, exposure calculations of a fuel assembly are performed, and changes of the composition of fuel are evaluated. At a condition of room temperature, neutron spectrum calculations are performed by using the changed composition of the fuel so as to evaluate a neutron multiplication factor, and to evaluate group constants to be used for neutron transport diffusion calculation. For accurate design calculations, neutron spectrum calculation may be conducted as the exposure increases. For a simplified calculation, no spectrum calculation may be conducted A void fraction is given for high temperature under high pressure to calculate as the exposure increases. And, the updated composition of the fuel as a result of irradiation is evaluated. Then, the neutron spectrum is calculated by using the updated fuel composition as a result of irradiation at room temperature (also referred as low temperature or cold mode) to evaluate the infinite multiplication factor and also the group constants to be used for neutron transport diffusion calculations.

Neutron transport diffusion calculations are conducted for the system to be measured by a fixed source calculation method to evaluate the neutron multiplication factor (k) at a certain position. While this value may be quantitatively different slightly from the effective multiplication factor used normally for the case of a BWR fuel assembly placed in water, but the difference is negligible in this embodiment. The inventors have found that the ratio (Fk) of the neutron multiplication factor and the infinite multiplication factor is not affected by the fuel composition if the position of measurement is more than 2 to 3 cm farther from the fuel assembly. "The infinite multiplication factor of the system to be measured is affected by the void fraction" means that the infinite multiplication factor changes because the composition is changed by the void fraction in cooling water during irradiation.

The procedure of this embodiment is described below.

The infinite multiplication factor ($k_\infty$) decreases substantially linearly as the exposure (E) increases. But the neutron multiplication effect appears due to build-up of plutonium at higher exposure. Therefore, the infinite multiplication factor ($k_\infty$) is approximated by the quadratic expression of exposure, i.e.;

$$k_\infty = J_0 - J_1 \times E + J_2 \times E^2$$

However, in many cases, it can be well approximated by a linear expression. The constant ($J_0$) and the coefficients ($J_1$, $J_2$) used for the quadratic approximation depend on the void fraction and the characteristics of the dependency can be evaluated by calculations for the different void fractions (ratios). For a fuel assembly which has the different initial enrichments for upper and lower part, the constant and the coefficients should include effects of enrichment.

Thus, the correlation of the infinite multiplication factor and the exposure is expressed as a function of the void fraction by calculations. Then, the axial distribution of infinite multiplication factor ($k_{\infty i}$) is calculated based on the exposure and the assumed void fraction (where i=1, the starting point of repeated calculations). And the axial neutron multiplication factor ($k_i$) is evaluated by using (Fk).

Then, the value of $(S_z/S_0)_i$ is calculated from the multiplication factor and the measured value of $(\phi_0/\phi_1)$. Also the axial distribution of $(a_z/a_0)_i$ is evaluated.

Finally, the distribution of the corrected axial void fraction ($v_i$, i=2) evaluated by revising the assumed void fraction (i=1) is evaluated from the relationship between the void fraction and the calculated ratio of $(a_z/a_0)_i$.

The corrected distribution is compared with the distribution that is not revised. And it is judged whether the axial distributions agree with each other within an allowable margin. If they do not agree, the calculation is performed again based on the revised distributions. The value obtained as a result of convergence is defined as the axial void distribution.

FOURTH EMBODIMENT

Figure 4:
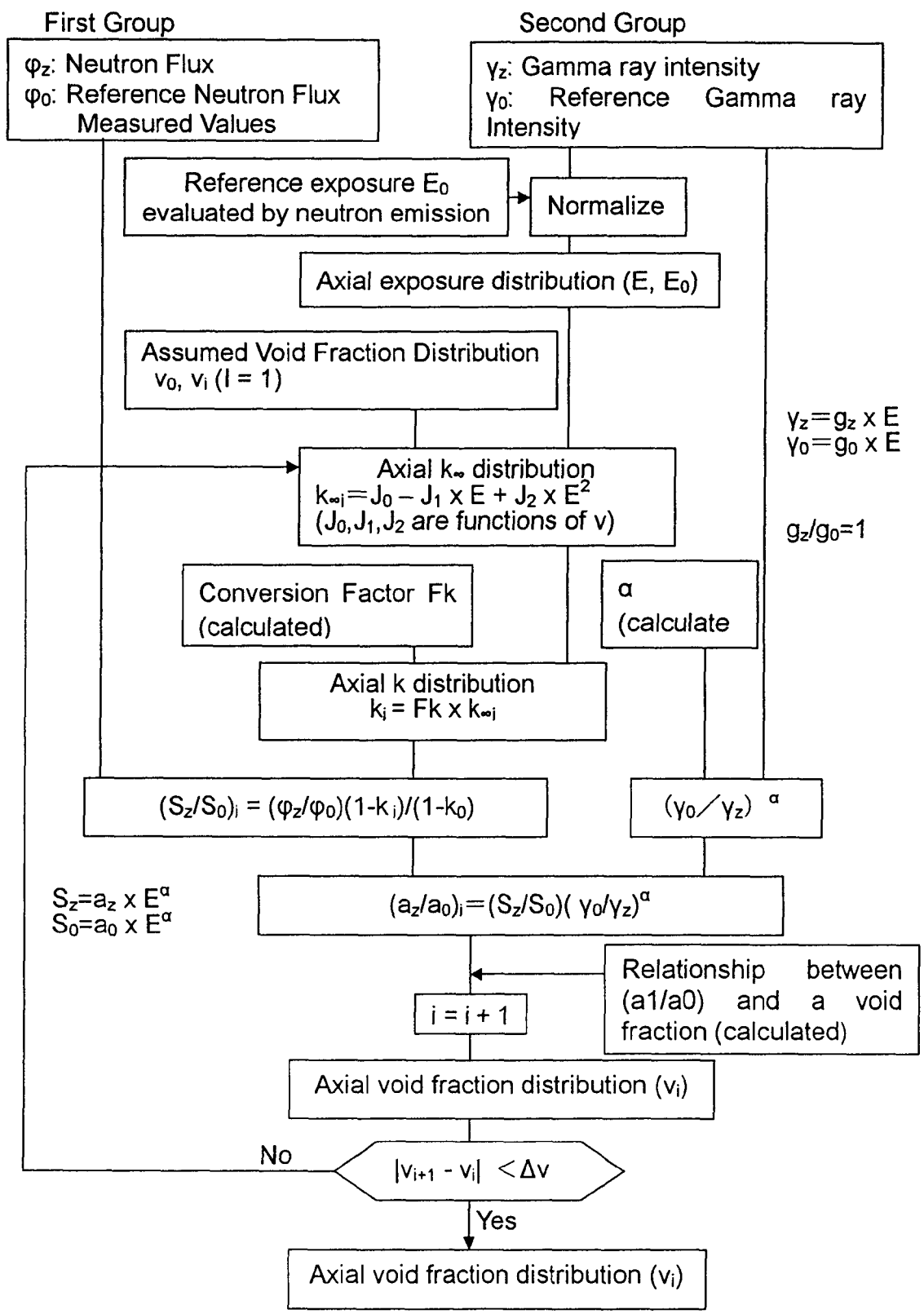
FIG. 4 is a flow chart of an axial void fraction distribution method according to the fourth embodiment of the present invention.

FIG. 4 is a flow chart of an axial void fraction distribution method according to the fourth embodiment of the present invention.

A difference of this embodiment from the third embodiment is that ($\phi_0/\phi_1$) is corrected for the contribution of the axial variation of the neutron multiplication factor based on the exposure $E_0$ at the reference position that is evaluated by using the neutron emission rate of the fuel. The exposure is evaluated with a method substantially identical to the neutron emission rate technique described in Japanese Patent Application Publication No. Sho 61-262689.

Figure 5:
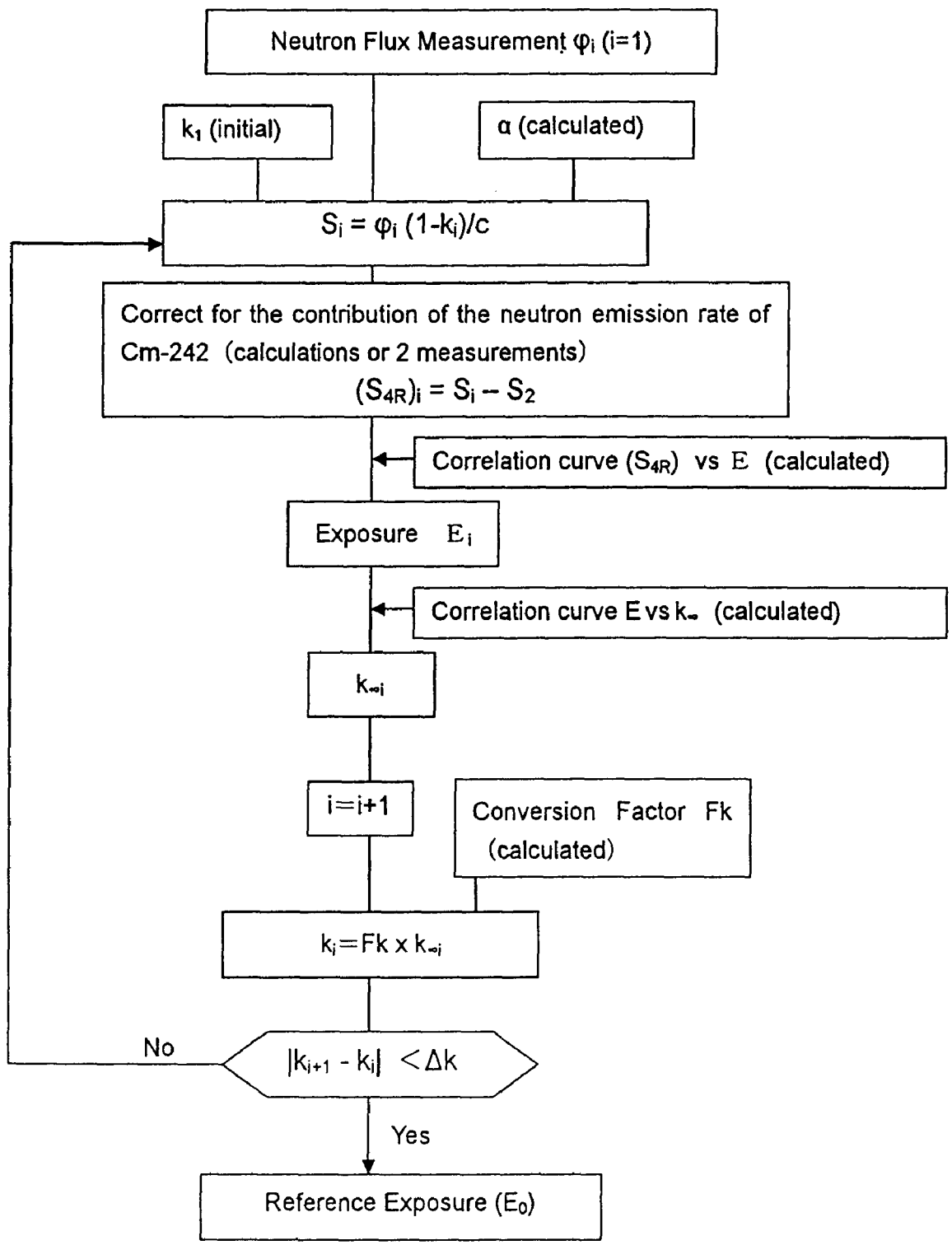
FIG. 5 is a flow chart of the neutron emission rate technique according to the fourth embodiment.

FIG. 5 illustrates a procedure of the neutron emission rate technique according to this embodiment.

In the neutron emission rate technique, the neutron flux ($\phi$) at a lateral surface of the fuel assembly is measured. Because an absolute value of the neutron flux is required for this method, a neutron detector is calibrated by a gold foil activation method or some other method.

The neutron flux or neutron counting rate ($\phi$) has a relationship with the neutron multiplication factor (k) and the neutron emission rate (S) that is expressed as $\phi = c \times S/(1-k)$, where (c) is a proportionality constant. The proportionality constant (c) can be determined by calculations as described above.

At the beginning (i=1) of the repeated calculation, an initial assumption of the neutron multiplication factor $k_z$ is given, and overall neutron emission rate Si is evaluated as $S_i = \phi_i(1-k_i)/c$. If it is necessary to correct for the contribution of the neutron emission rate of Cm-242, the $S_2$ component is eliminated by calculations or by two or more measurements for different cooling periods, utilizing the difference of half-lives. In short, the value of $(S_{4R})_i$ is calculated as $(S_{4R})_i = S_i - S_2$. Then, ($E_i$) is determined by using the calibration curve that correlates $S_{4R}$ for the void fraction of 0%. The calibration curve can be calculated from this value and the exposure.

Further, $k_{\infty i}$ is evaluated by using the calibration curves that correlates the calculated $k_\infty$ and E, or correlates $S_{4R}$ and E. Then, the revised neutron multiplication factor $k_i$ is evaluated from this value by using the conversion factor (Fk) for the system to be measured. If the difference between the revised neutron multiplication factor and the corresponding unrevised value is found within an allowable range, the revised neutron multiplication factor is a final one. If the difference is greater than the range, the calculation is repeated by using the initial or last revised values, and the values obtained as a result of convergence is defined as the neutron multiplication factor.

Repeated calculations are required because a transcendental function is practically included in this method and convergence can be achieved by about 3 to 5 times repeated calculation. This neutron emission rate technique can evaluate a plutonium concentration, an infinite multiplication factor and the neutron multiplication factor, as well as exposure in the same calculations.

FIFTH EMBODIMENT

Figure 6:
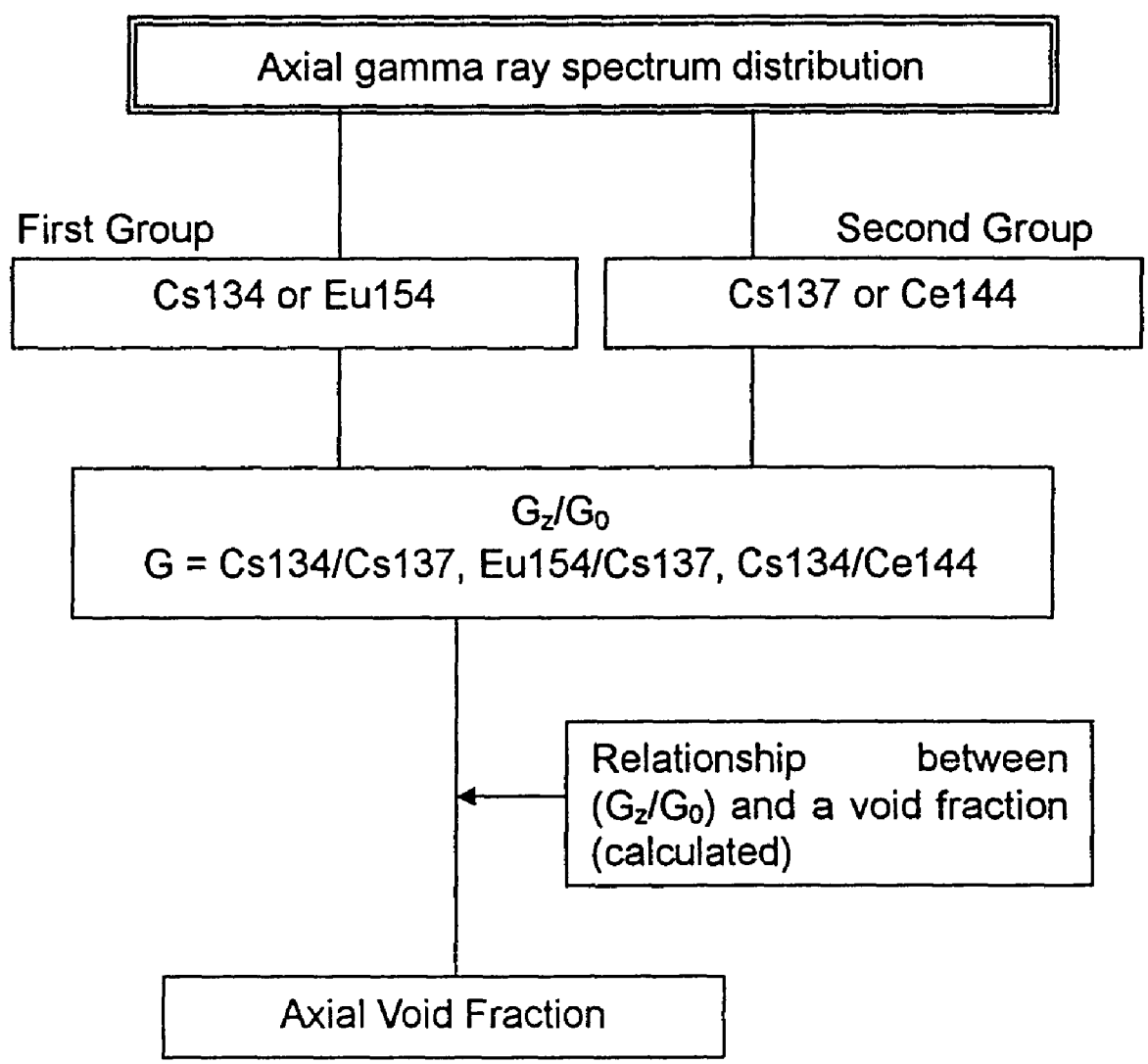
FIG. 6 is a flow chart of an axial void fraction distribution evaluation method according to the fifth embodiment of the present invention.

FIG. 6 is a flow chart of an axial void fraction distribution evaluation method according to the fifth embodiment of the present invention.

In this embodiment, only gamma ray spectrum measurement is performed to achieve the objective, so that it is called a gamma ray spectrum analysis method. This embodiment utilizes the conventional measurement techniques such as a Ge semiconductor detector. A gamma ray collimator is arranged close to a lateral surface of the irradiated fuel assembly and gamma rays are led through it. Then, the gamma ray spectrum is measured by a semiconductor detector. By this measurement, the intensity of target gamma rays emitted from Cs-137, Cs-134, Ce-144, Eu-154 and so on are measured.

While it is not always true that the intensity of these gamma rays can be measured with accuracy, it is well known to those skilled in the art what condition is required to measure with accuracy.

In the gamma ray spectrum analysis method, the combinations of Cs134 with Cs137, Eu154 with Cs137, and Cs134 with Ce144 are expressed as their ratios. The axial distributions $(G_z/G_0)$ are evaluated. Then, the axial void fraction distribution is evaluated based on the calibration curve evaluated computationally that correlates $(G_z/G_0)$ and the void fraction.

SIXTH EMBODIMENT

Figure 7:
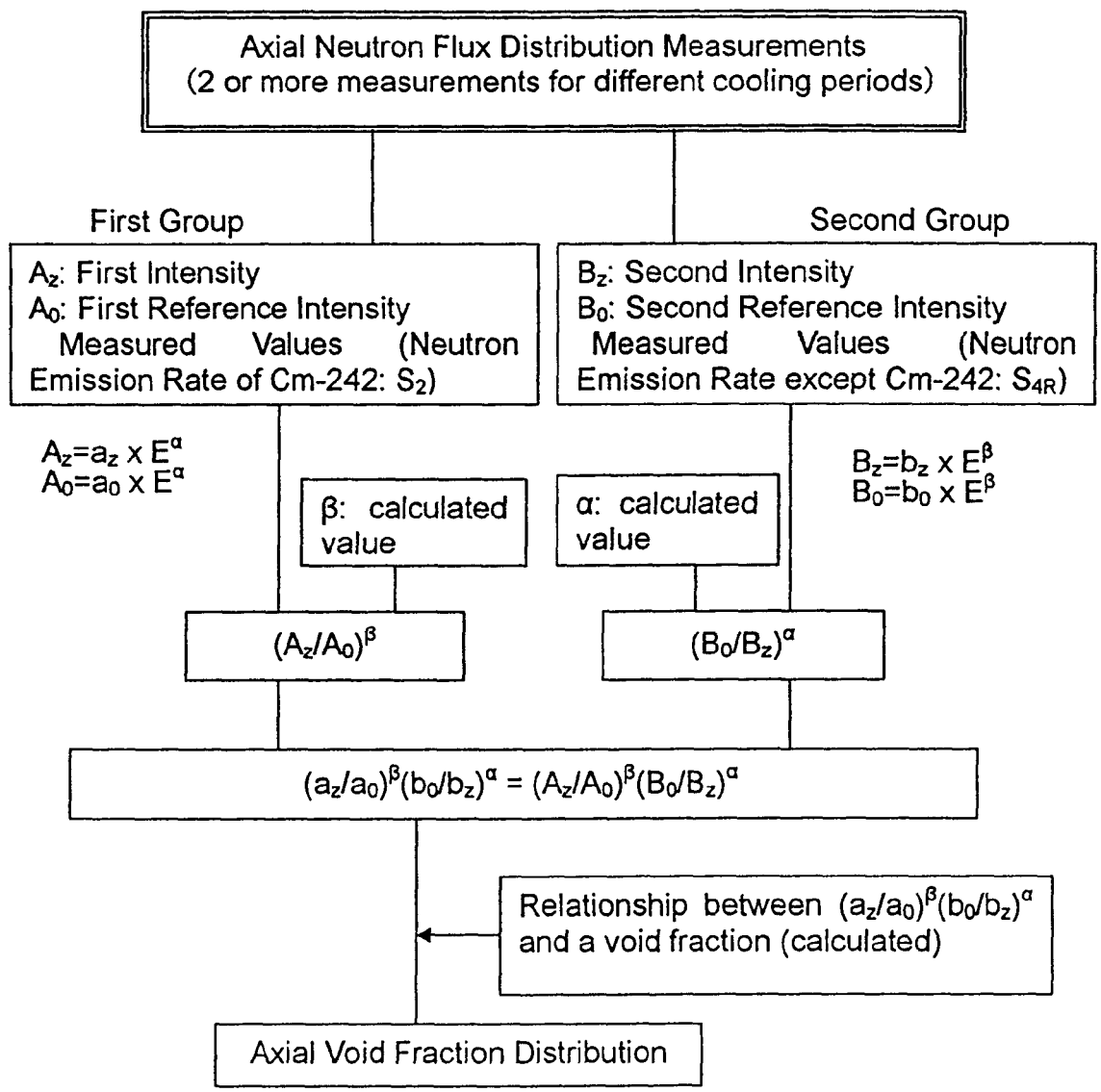
FIG. 7 is a flow chart of an axial void fraction distribution method according to the sixth embodiment of the present invention.

FIG. 7 is a flow chart of an axial void fraction distribution method according to the sixth embodiment of the present invention.

This embodiment utilizes the difference of gradient between $S_2$ and $S_{4R}$ in FIGS. 10 and 11. It can be applied if the exposure is very low, for example lower than about 7 to 10 GWd/t.

This embodiment is a method to evaluate an axial void fraction distribution only by measurement of a neutron emission rate, and is preferable for low exposure. The ratio of the neutron emission rate $(S_2)$ of Cm242 and the neutron emission rate $(S_{4R})$ of all the other nuclides is evaluated. Then the axial void fraction distribution is evaluated by using the calibration curve for the calculated axial distribution of the ratio. This procedure is similar to the procedures described as the fifth embodiment.

More specifically, the emission rates of neutrons emitted from the nuclides in the fuel assembly irradiated in the reactor caused by neutron capture reaction are measured at least twice for cooling periods with a certain interval.

Then, the first neutron emission rate $(S_2)$ of neutrons emitted from Cm-242 and the second neutron emission rate $(S_{4R})$ Of neutrons emitted from the other nuclides are discriminated by using the difference of half-lives.

The first neutron emission rate $(A_z=S_2)$ is expressed as it is proportional to an exponent of the exposure (E), expressed as $A_z=a_z \times E^\alpha$, where $a_z$ is a proportionality constant. Additionally, the measured second neutron emission rate $(B_z=S_{4R})$ is regarded proportional to an exponent of the exposure (E), expressed as $B_z=b_z \times E^\beta$, where b is a proportionality constant.

Then, the both sides of the equation of the first neutron emission rate are raised to the power of β and the both sides of the equation of the second neutron emission rate are raised to the power of α. Subsequently, the ratio of the two raised formulae is derived to eliminate the exposure term. The ratio is divided by the equation for the reference position. The following equation is derived.

$$(a_z/a_0)^\beta(b_0/b_z)^\alpha = (A_z/A_0)^\beta(B_0/B_z)^\alpha.$$

Numeral "0" denotes that the value is for the reference position.

Then, the axial void fraction distribution is evaluated by using the calibration curve, and measured value of $(A_z/A_0)$ and $(B_0/B_z)$, utilizing the characteristic that $(a_z/a_0)^\beta(b_0/b_z)^\alpha$ depends on the axial void fraction distribution in the nuclear reactor.

It is hard to apply this embodiment to a case that a contribution of Cm-242 to the neutron emission rate $(S_{4R})$ is low. This is because that the dependency of $(a_z/a_0)$ and that of $(b_0/b_z)$ on the void fraction distribution are inverse relative to each other resulting in elimination of the dependency of $(a_z/a_0)^\beta(b_0/b_z)^\alpha$ on the void fraction distribution. So, this embodiment is applicable only to the low exposure fuel.

Additionally, the use of Cm-242 makes it hard to apply this embodiment to a case that a cooling period of the fuel is longer than about two years. And the large sensitivity on the exposure makes the exposure data necessary. However, this method has a large merit because it requires measurements of only neutrons.

SEVENTH EMBODIMENT

Figure 8:
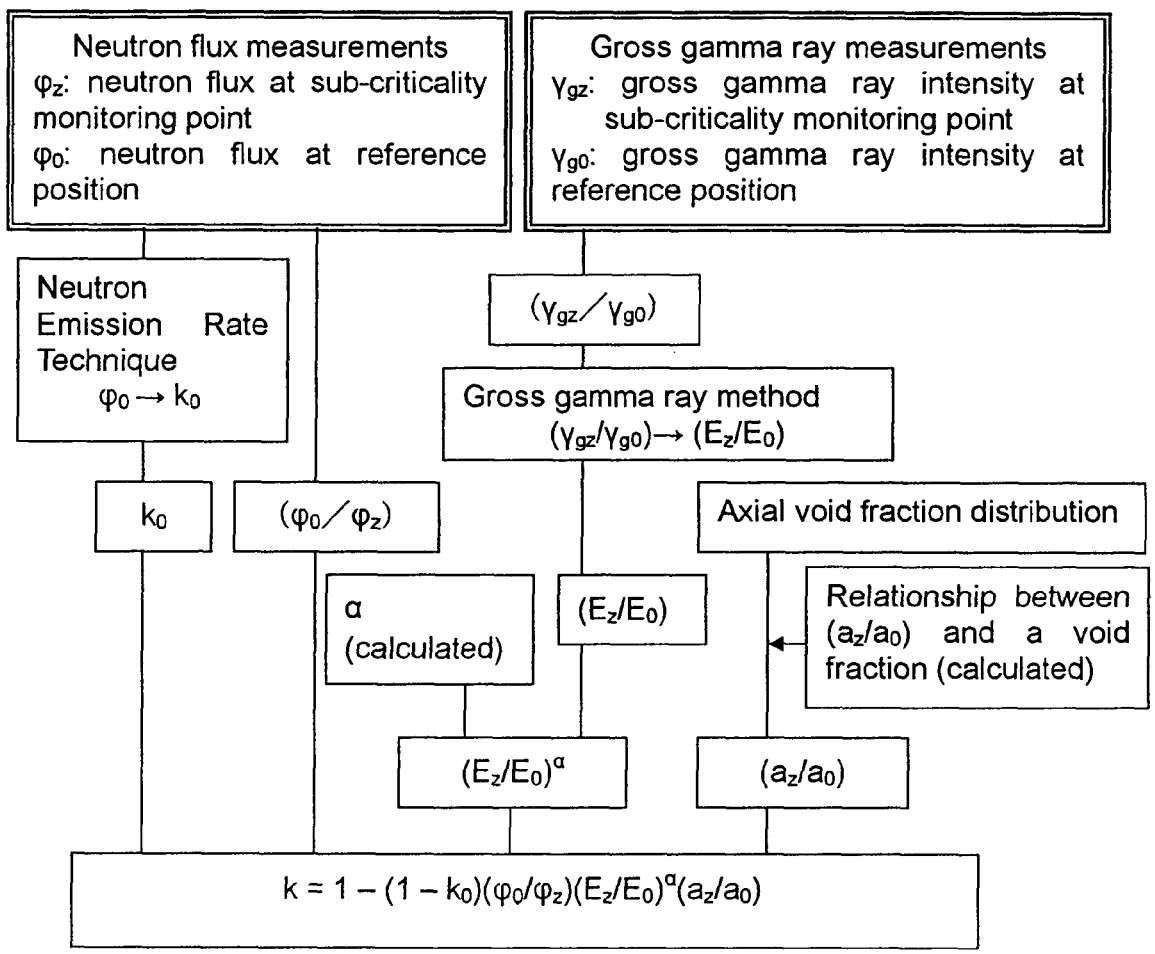
FIG. 8 is a flow chart of a neutron multiplication factor evaluation method according to the seventh embodiment of the present invention.

FIG. 8 is a flow chart of a neutron multiplication factor evaluation method according to the seventh embodiment of the present invention.

This embodiment is a method to evaluate a neutron multiplication factor of a fuel assembly before it is contained in a fuel assembly containing apparatus.

A neutron multiplication factor at about ⅔ to ¾ from the lower end of the axial fuel effective part of an irradiated (or discharged) BWR fuel assembly tends to be higher. When the fuel assembly is contained in a container apparatus, this part decreases a sub-criticality (or makes criticality close to unity). Therefore, without a measurement of the multiplication factor of this part of the fuel, it is necessary to take a large design margin so as to secure the criticality safety. By this embodiment, measuring the multiplication factor of each fuel assembly actually makes it possible to reduce the design margin.

In this embodiment, neutron fluxes are measured at a reference point and at a sub-criticality monitoring point of an irradiated fuel assembly. The ratio of the neutron multiplication factor $(k_0)$ and the neutron flux or neutron counting rate $(\phi_0/\phi_z)$ are evaluated for the reference point by using the neutron emission rate technique described above. Also, the gross gamma ray intensity ratio $(\gamma_{gz}/\gamma_{g0})$ is measured. In addition, the correlation of the gross gamma ray intensity relative distribution and the exposure relative distribution is calculated separately (the difference caused by the difference of distribution pattern is normally less than 10%). The gross gamma ray intensity ratio $(\gamma_{gz}/\gamma_g0)$ is reduced to the ratio relative to exposure by using the correlation, and $(E_z/E_0)^\alpha$ is evaluated by using the calculated value of α that is a value of exponent to be raised to the exposure (E).

If a typical void fraction distribution is evaluated by measuring some fuel assemblies of the same type of assembly by the method described in other embodiments or other means, it is possible to define the void fraction at the sub-criticality monitoring point. With this void fraction, the value of $(a_z/a_0)$ is evaluated reversely based on the correlation of $(a_z/a_0)$ and the void fraction, and the neutron multiplication factor at the sub-criticality monitoring point is evaluated by the following equation before the fuel assembly is contained in a fuel assembly containing apparatus.

$$k=1-(1-k_0)(\phi_0/\phi_z)(E_z/E_0)^\alpha(a_z/a_0)$$

The gross gamma ray measurement method is already established by the inventors of the present invention and adopted in the commercial reprocessing plants. Besides, it is known that similar phenomena occur in an irradiated (discharged) pressurized water reactor (PWR) fuel assembly due to the water temperature, the water density, the control rod effect and other factors but voids so that the method of this embodiment can be applied by taking their influences into the factor of $(a_z/a_0)$.

Of course, a gamma ray spectrum analysis can be applied to this embodiment in place of the gross gamma ray measurement. But the gross gamma ray measurement may be more practical than the gamma ray spectrum analysis even if the accuracy of the gross gamma ray measurement might be lower, because the gamma ray spectrum analysis requires a larger devices and more complicated data processing in general.

Numerous modifications and variation of the present invention are possible in light of the above teachings. It is, therefore, to be understood that, within the scope of the appended claims, the present invention can be practiced in a manner other than as specifically described herein.

What is claimed is:

1. A method for evaluating an axial void fraction distribution of a fuel irradiated in a nuclear reactor, the method comprising:
   measuring a first intensity $A_z$ of radioactivity originated from a first group at an axial position of the fuel, the first group consisting of neutron-emitting nuclides generated by a neutron capture reaction of a heavy nuclide;
   measuring a second intensity $B_z$ of radioactivity originated from a second group at the axial position of the fuel, the second group consisting of gamma-emitting radioactive fission product nuclides that is not generated by a neutron capture reaction and of which generated amount is substantially proportional to an exposure of the fuel in a certain range of the exposure;
   measuring a first reference intensity $A_0$ of radioactivity of the first group at an axial reference position of the fuel at which a void fraction of the fuel can be evaluated;
   measuring a second reference intensity $B_0$ of radioactivity rays of the second group at the axial reference position;
   calculating an exponent constant a used in an expression of $A_z=a_z \times E^\alpha$ and $A_0=a_0 \times E^\alpha$ where E is an exposure of the fuel, $a_z$ and $a_0$ are proportionality constants;
   evaluating a value of $(a_z/a_0)$ by an equation of $(a_z/a_0)=(A_z/A_0)(B_0/B_z)^\alpha (b_z/-b_0)^\alpha$, where $b_z$ is a value used in an expression of $B_z=b_z \times E$ as a proportionality constant, $b_0$ is a value used in an expression of $B_0=b_0 \times E$ as a proportionality constant;
   evaluating a correlation curve of $(a_z/a_0)$ and a void fraction; and
   evaluating the axial void fraction distribution based on the value of $(a_z/a_0)$ and the correlation curve.

2. The method of claim 1, wherein the first intensity and the first reference intensity are neutron emission rates, and the second intensity and the second reference intensity are gamma ray intensities of a fission product that is proportional to the exposure within a certain exposure range.

3. The method of claim 2, wherein the neutron emission rates include rates of neutron emission of nuclides except curium 242, and the gamma ray intensities include a gamma ray intensity of cesium 137.

4. The method of claim 2, wherein the neutron emission rates include rates of neutrons emission of curium 244, and the gamma ray intensities include a gamma ray intensity of cesium 137 or cerium 144.

5. The method of claim 2, wherein the neutron emission rates include rates of neutrons emission of curium 242, and the gamma ray intensities include a gamma ray intensity of cesium 137 or cerium 144.

6. The method of claim 2, wherein the neutron emission rates are neutron emission rates except for curium 242 and curium 244, and the gamma ray intensities include a gamma ray intensity of cesium 137 or cerium 144.

7. The method of claim 2, further comprising:
   evaluating a neutron multiplication factor $k_z$ at a plurality of axial position of the fuel assembly, and a neutron multiplication factor $k_0$ at the reference position;
   wherein the step of evaluating a value of $(a_z/a_0)$ includes:
      measuring a neutron flux or a neutron counting rate $\phi_z$;
      measuring a neutron flux or a neutron counting rate $\phi_0$ at the reference position;
      calculating a ratio of the neutron emission rate to that at the reference position, $S_z/S_0$, by an equation of $S_z/S_0 = (\phi_z/\phi_0)/(1-k_z)/(1-k_0)$; and
   assuming $A_z/A_0$ equal to $S_z/S_0$.

8. The method of claim 2, further comprising:
   calculating an axial exposure distribution based on an assembly-averaged fuel exposure and an axial distribution of an intensity of gamma ray, by assuming the axial exposure distribution equal to the axial distribution of an intensity of gamma ray; and,
   evaluating a conversion factor from an infinite multiplication factor to a neutron multiplication factor by a neutron transport diffusion calculation according to a condition of the measurement;
   wherein the step of evaluating the axial void fraction distribution includes evaluating the axial void fraction distribution by repeating following (i) to (vii) steps until a convergence of the axial void fraction distribution, assuming an infinite multiplication factor can be expressed as a quadratic function of the exposure where parameters of the function depends on the void fraction:
   (i) assuming an axial void fraction distribution as appropriate one for an initial calculation, or an axial void fraction distribution calculated at the step of (vii) of a previous loop for a calculation except the initial calculation;
   (ii) calculating an infinite multiplication factor based on the assumed axial void fraction distribution;
   (iii) calculating an neutron multiplication factor $k_z$ and $k_0$ by using the conversion factor and the multiplication factor;
   (iv) calculating a ratio of neutron emission rate to that at the reference position $S_z/S_0$ based on the neutron multiplication factor $k_z$ and $k_0$;
   (v) calculating $a_z/a_0$ based on $S_z/S_0$;
   (vi) evaluating the axial void fraction distribution based on $a_z/a_0$ and the correlation curve; and
   (vii) terminating if a convergence of the axial void fraction distribution is achieved, or returning to the step of (i), if not.

9. The method of claim 8, further comprising:
   evaluating an exposure at the reference position by a neutron emission rate technique.

10. The method of claim 1, wherein the first group includes gamma ray emitting nuclides transmuted by neutron capture reactions after generation by fission, and the second group includes gamma ray emitting nuclides that is not subjected to a neutron reaction and emit gamma ray proportional to the exposure within a definite range.

11. The method of claim 10, wherein the first group includes cesium 134 or europium 154, and the second group includes cesium 137 or cerium 144.

* * * * *